United States Patent
Batarseh et al.

(10) Patent No.: US 9,965,969 B2
(45) Date of Patent: May 8, 2018

(54) COMPUTING DEVICE PROVIDING ELECTRONIC BOOK DATA WITH CONFIGURABLE PROBLEMS AND CHANGEABLE SOLUTION TECHNIQUES AND RELATED METHODS

(71) Applicant: UNIVERSITY OF CENTRAL FLORIDA RESEARCH FOUNDATION, INC., Orlando, FL (US)

(72) Inventors: Issa Batarseh, Oviedo, FL (US); Ghaith Haddad, Orlando, FL (US); Rashad Oreifej, Orlando, FL (US); Rawad Al-Haddad, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 206 days.

(21) Appl. No.: 14/874,608

(22) Filed: Oct. 5, 2015

(65) Prior Publication Data

US 2016/0027316 A1 Jan. 28, 2016

Related U.S. Application Data

(63) Continuation of application No. 13/735,593, filed on Jan. 7, 2013, now Pat. No. 9,368,038, which is a
(Continued)

(51) Int. Cl.
*G06F 3/0483* (2013.01)
*G06F 7/58* (2006.01)
(Continued)

(52) U.S. Cl.
CPC ............ *G09B 5/02* (2013.01); *G06F 3/0483* (2013.01); *G06F 3/04847* (2013.01);
(Continued)

(58) Field of Classification Search
CPC .... G06F 3/0483; G06F 7/582; G06F 15/0291; G09B 5/125; G09B 7/04; G09B 7/073;
(Continued)

(56) References Cited

U.S. PATENT DOCUMENTS

| 5,258,936 A | 11/1993 | Gallup et al. |
| 5,663,748 A | 9/1997 | Huffman et al. |

(Continued)

FOREIGN PATENT DOCUMENTS

| GB | 2345558 | 7/2000 |
| JP | 06295317 | 10/1994 |
| JP | 2007034047 | 2/2007 |

OTHER PUBLICATIONS

U.S. Appl. No. 14/874,588, filed Oct. 5, 2015.
(Continued)

*Primary Examiner* — Eric J Bycer
(74) *Attorney, Agent, or Firm* — Allen, Dyer, Doppelt & Gilchrist, P.A.

(57) ABSTRACT

A computing device may include a display, a memory to store electronic textbook data comprising at least one configurable problem to be solved using a given solution technique from among a plurality of different solution techniques, a user input device, and a processor coupled to the display, the memory, and the user input device. The processor may be configured to display the electronic textbook data with the at least one configurable problem on the display, selectively change the given solution technique for the at least one configurable problem based upon the user input device, and display a solution for the at least one
(Continued)

configurable problem on the display responsive to the change in the given solution technique.

17 Claims, 34 Drawing Sheets

Related U.S. Application Data continuation of application No. 12/034,935, filed on Feb. 21, 2008, now Pat. No. 8,352,876.

(60) Provisional application No. 60/902,582, filed on Feb. 21, 2007.

(51) Int. Cl.
| | |
|---|---|
| *G06F 15/02* | (2006.01) |
| *G09B 5/12* | (2006.01) |
| *G09B 7/04* | (2006.01) |
| *G09B 7/073* | (2006.01) |
| *G09B 7/077* | (2006.01) |
| *G09B 23/18* | (2006.01) |
| *G09B 5/02* | (2006.01) |
| *G06T 11/60* | (2006.01) |
| *G06F 3/0484* | (2013.01) |
| *G09B 7/00* | (2006.01) |
| *G09B 7/02* | (2006.01) |

(52) U.S. Cl.
CPC ............... *G06T 11/60* (2013.01); *G09B 7/00* (2013.01); *G06F 7/582* (2013.01); *G06F 15/0291* (2013.01); *G09B 5/125* (2013.01); *G09B 7/02* (2013.01); *G09B 7/04* (2013.01); *G09B 7/073* (2013.01); *G09B 7/077* (2013.01); *G09B 23/185* (2013.01); *G09B 23/186* (2013.01); *Y10S 345/901* (2013.01)

(58) Field of Classification Search
CPC .... G09B 7/077; G09B 23/185; G09B 23/186; Y10S 345/901
See application file for complete search history.

(56) References Cited

U.S. PATENT DOCUMENTS

| | | | |
|---|---|---|---|
| 5,761,485 A | 6/1998 | Munyan | |
| 5,779,545 A | 7/1998 | Berg et al. | |
| 5,937,158 A | 8/1999 | Uranaka | |
| 5,956,034 A | 9/1999 | Sachs et al. | |
| 6,018,617 A | 1/2000 | Sweitzer et al. | |
| 6,091,930 A | 7/2000 | Mortimer et al. | |
| 6,112,051 A | 8/2000 | De Almeida | |
| 6,229,502 B1 | 5/2001 | Schwab | |
| D449,606 S | 10/2001 | Lee et al. | |
| 6,313,828 B1 | 11/2001 | Chombo | |
| 6,335,678 B1 | 1/2002 | Heutschi | |
| 6,413,100 B1 | 7/2002 | Dickmeyer et al. | |
| 6,421,524 B1 | 7/2002 | Padgett | |
| 6,540,520 B2 | 4/2003 | Johnson et al. | |
| 6,549,751 B1 | 4/2003 | Mandri | |
| 6,933,928 B1 | 8/2005 | Lilienthal | |
| 6,959,425 B1 | 10/2005 | Krauklis | |
| 6,966,026 B1 | 11/2005 | Sommerer | |
| 7,017,159 B1 | 3/2006 | Baker | |
| 7,103,848 B2 | 9/2006 | Barsness et al. | |
| 7,153,140 B2 | 12/2006 | Ivanir et al. | |
| 7,236,966 B1 | 6/2007 | Jackson et al. | |
| 7,260,781 B2 | 8/2007 | DeMello et al. | |
| 2002/0049738 A1 | 4/2002 | Epstein | |
| 2002/0197594 A1 | 12/2002 | Dickmeyer et al. | |
| 2003/0107681 A1 | 6/2003 | Otawara et al. | |
| 2003/0144961 A1 | 7/2003 | Tharaken et al. | |
| 2003/0172052 A1 | 9/2003 | Crandell et al. | |
| 2004/0205645 A1 | 10/2004 | Hoffman | |
| 2004/0206809 A1 | 10/2004 | Wood et al. | |
| 2005/0005246 A1 | 1/2005 | Card et al. | |
| 2005/0058976 A1 | 3/2005 | Vernon | |
| 2005/0066288 A1 | 3/2005 | Hemmings | |
| 2006/0032363 A1 | 2/2006 | Platt | |
| 2007/0020604 A1 | 1/2007 | Chulet | |
| 2008/0014569 A1 | 1/2008 | Holiday et al. | |
| 2013/0177892 A1 | 7/2013 | Batarseh et al. | |
| 2013/0179823 A1 | 7/2013 | Batarseh et al. | |

OTHER PUBLICATIONS

U.S. Appl. No. 14/874,562, filed Oct. 5, 2015.
Wilson et al. "Eboni Electronic Textbook Design Guidelines" Department of Computer Science, University of Strathclyde, UK, Mar. 23, 2002.
Armeth-Brothers, Francine R. "Design and Development of Modules for a Medical Terminology Electronic Textbook".
Unfred, David W. "A Comparative Study of Two Electronic Textbook Interface Design Metaphors Relative to Self-Efficacy, Attitudes, and Learning Orientation".
Murray et al. "The Architecture of an Electronick Book".
"Java Virtual Machine" Microsoft Computer Dictionary, Fifth Edition, p. 372-473, 2002.
McGough et al "A Web-Based Testing System With Dynamic Question Generation" 31st ASEE/IEEE Frontiers in Eductiaotn Conference Oct. 10-13, 2001 Reno, NV.
Sinclair et al., "Practical Electronics Handbook," Jan. 11, 2007 (4 pages).

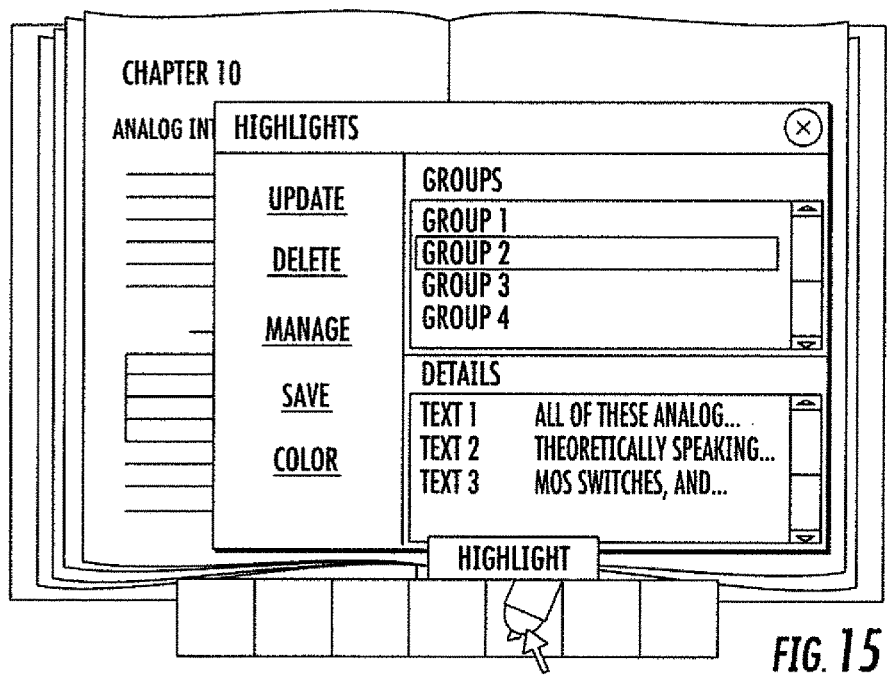

COMPUTING DEVICE PROVIDING ELECTRONIC BOOK DATA WITH CONFIGURABLE PROBLEMS AND CHANGEABLE SOLUTION TECHNIQUES AND RELATED METHODS

CROSS-REFERENCE TO RELATED APPLICATIONS

This is a continuation patent application of U.S. patent application Ser. No. 13/735,593 filed Jan. 7, 2013, now U.S. Pat. No. 9,368,038, which claims the benefit of U.S. application Ser. No. 12/034,935 filed Feb. 21, 2008, now U.S. Pat. No. 8,352,876, which in turn claims priority from U.S. Provisional Patent Application 60/902,582 filed Feb. 21, 2007, all of which are hereby incorporated herein in their entireties by reference.

FIELD OF INVENTION

This invention relates to electronic books, in particular to interactive electronic book operating systems and methods, such as for use with scientific, engineering and any other technical topic books.

BACKGROUND AND PRIOR ART

Electronic books have been growing in popularity in recent years primarily in hardware applications, and have limited interactive features. A major problem with electronic books is that the electronic books are limited to displaying general fiction and non fiction topics and are not useful for displaying and education students in science, engineering and other technical topics.

Still another problem with electronic type books is that they generally have a single screen with a flat image, that does not have the look and feel of classical books, and typically limited to one or two-page displays. Another problem with electronic books is that the computer screen (both desktop and laptop types) does not replicate a full page of a book, and instead has part of it.

Various types of systems and methods have been proposed for using portable devices to display publications. See for example, U.S. Pat. No. 5,761,485 to Munyan; U.S. Pat. No. 5,937,158 to Uranka; U.S. Pat. No. 6,229,502 to Schwab; U.S. Pat. No. 6,933,928 to Lilienthal; U.S. Pat. No. 6,959,425 to Krauklis; U.S. Pat. No. 6,966,026 to Sommerer; U.S. Pat. No. 7,017,159 to Baker; U.S. Pat. No. D449,606 to Lee et al.; U.S. Pat. No. 6,421,524 to Padgett; U.S. Pat. No. 6,313,828 to Chombo; U.S. Pat. No. 6,335,678 to Heutschi; and U.S. Pat. No. 7,260,781 to DeMello et al.

The Munyan '485 patent describes a personal electronic book system that requires extensive hardware to operate. The Uranka '158 patent describes techniques for customization for each user on a portable media in combination with use of the network with the focus on identifying and displaying information. The required customization techniques for each publication does not allow for uniformity of displaying printed publications.

The Schwab '502 describes an elaborate hardware driven hand-held digital data reader (hinged electronic book with two-face to face touch-screens) that functions like an electronic book and requires side thumb buttons on the side of the books and not on any of the pages.

Lilienthal '928 describes a portable device that displays and plays audio and video content like a DVD player but is not easily usuable to read books.

Krauklis '425 describes a system and method of managing scalable list of items for display on a portable device and not for easily displaying and manipulating books.

Sommerer '026 describes a system for managing a balanced view of generated pages on an electronic device with a rolling pair of lines basis.

Baker '159 describes a system for presenting book marks for small devices such cell phones and PDAs for use on small screen displays and not for regular sized books.

Lee '606 shows a hardware design of a "portable electronic book" that appears to resemble a laptop with removable cover and not for displaying full pages of open books.

Padgett '524 describes a talking book with microphone that is generally limited to recording and playing an audio recordings.

Chombo '828 describes a hardware system of a hinged two display electronic book having various size buttons controls and does not have an efficient operating system.

Heutschi '678 describes a electronic touch screen devices for a display of electronic book that is connected to the network.

General proposals have been made for electronic books that usually require specific hardware components that may allow for displaying simple fiction and general nonfiction type content, but are not applicable at all for technical books, and the like. Such technical books like those used in various sciences, mathematics, engineering and the like, are not able to be used with the prior art. Thus, the need exists for solutions to the problems with the prior art, namely, the need for a software platform that handle the display and interactive interaction of readers with the technical book contents.

BRIEF DESCRIPTION OF THE FIGURES

FIG. 15 shows the highlight feature.

FIG. 16 is flowchart for implementing sticky Notes.

SUMMARY OF THE INVENTION

Figure 1:
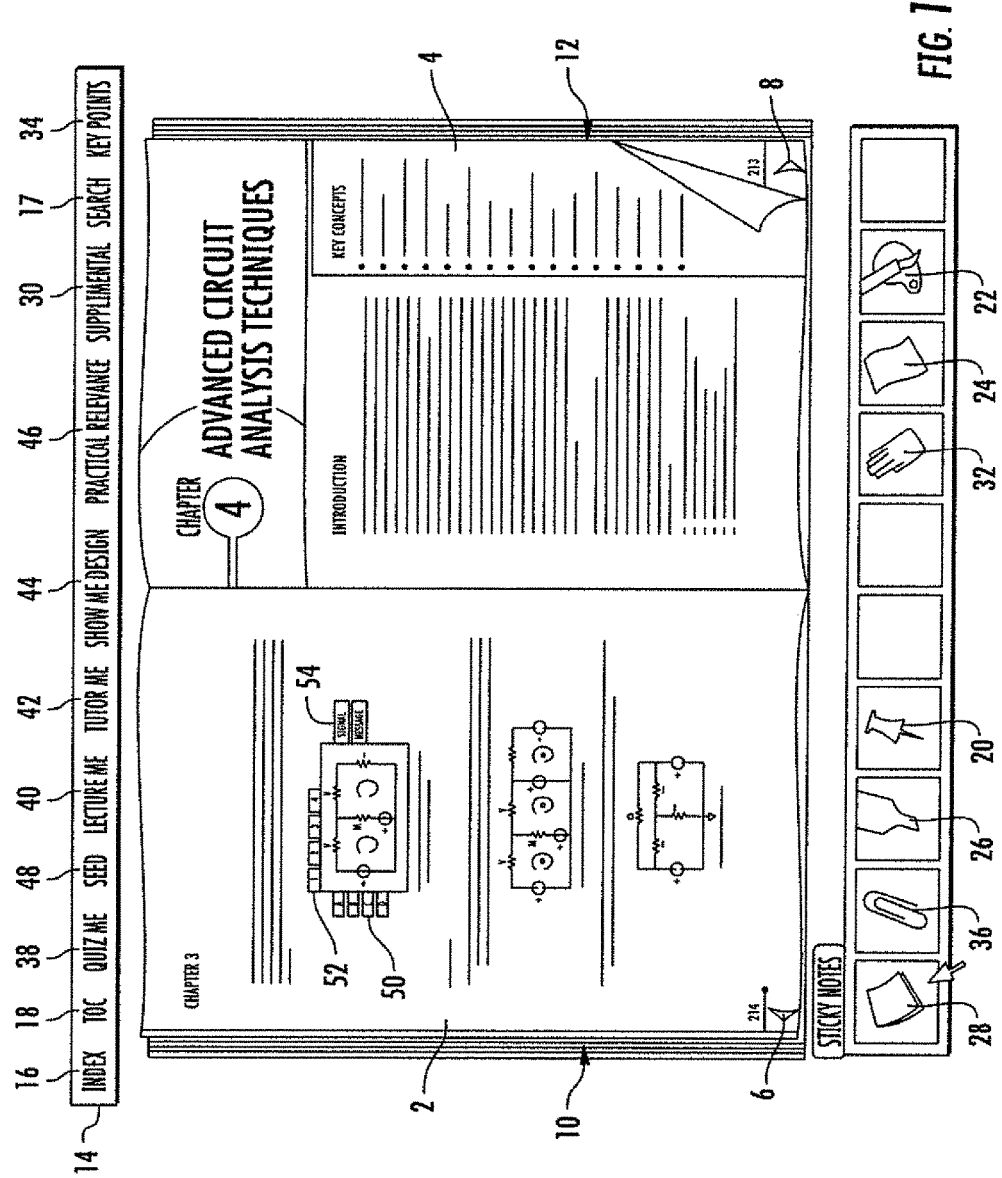
FIG. 1 is an overview of a main screen of an open digital book on a computing device.

In an example embodiment, interactive electronic book operating systems and methods may allow an interactive electronic book to replicate the appearance of a classical book having two pages on each screen that is useful for displaying books of all types from fiction to nonfiction and technical and professional books.

In another example embodiment, an interactive electronic book operating system and methods may provide the look and functionality of a printed book in tactile feel and visual appearance, and can be used with books having all types of subject matter ranging from fiction, nonfiction, technical and professional books.

In yet another example embodiment, an interactive electronic book operating system and methods may provide hardware independence, cross-platform capable, flexible operating system for the "technical book of the future" for engineering and science fields.

In still another example embodiment, an interactive electronic book operating system and methods may provide an extremely rich book effect that brings images and symbolic equations and other elements into a very high interactive representations.

In another example embodiment, an interactive electronic book operating system and methods may provide a friendly student-instructor learning environment that simplifies the technical concepts and learning material by allowing immediate numerical solutions of complex equations. Therefore this operating system serves an excellent platform for design tools for engineering and science students and professionals.

In still another example embodiment, an interactive electronic book operating system and methods may provide relatively easy interfaces with new learning elements through interactive Java® applets.

More particularly, a computer system may include a plurality of computing devices each including a display, a memory to store electronic book data comprising at least one configurable problem to be solved, and a processor coupled to the display and the memory. The processor may display the electronic book data with the at least one configurable problem on the display, and apply a changeable seed value to the at least one configurable problem to change an answer associated with the at least one configurable problem.

The processors may apply a common seed value to the at least one configurable problem. Furthermore, the processors may apply a different seed value to the at least one configurable problem. By way of example, the changeable seed value may be a pseudorandom seed value. The plurality of computing devices may be student computing devices, and the system may further include an instructor computing device to distribute the changeable seed value to the student computing devices.

The at least one configurable problem may comprise a plurality of configurable problems, and each of the processors may apply the changeable seed value across the plurality of configurable problems. By way of example, the at least one configurable problem may include a scientific problem(s), mathematical problem(s), engineering problem(s), etc.

A related computing device, such as the one described briefly above, as well as a related method for using the computing device(s) are also provided. The method may include storing electronic book data in the memory comprising at least one configurable problem to be solved, displaying the electronic book data with the at least one configurable problem on the display, and applying a changeable seed value to the at least one configurable problem to change an answer associated with the at least one configurable problem.

A related non-transitory computer-readable medium is for a computing device, such as the one described briefly above. The non-transitory computer readable medium may have computer-executable instructions for causing the computing device to perform steps including storing electronic book data in the memory comprising at least one configurable problem to be solved, displaying the electronic book data with the at least one configurable problem on the display, and applying a changeable seed value to the at least one configurable problem to change an answer associated with the at least one configurable problem.

Preferred embodiments of the interactive electronic book operating systems and method can include a computer platform with a single display screen, a complete digital book from the group consisting solely of a science book topic and a technical book topic downloaded onto the computer platform, where a single page or two pages can be displayed in a classical type appearance on the screen. The operating system and method allows for the reader to be able to move and navigate through the book with the similar ease to that of a classical book, such as being able to flip forward and backward through the pages.

The methods and systems can include a forward and backward frame icon on the screen that allow the user to flip forward and backward to different sections and chapters of the open book.

The methods and systems can include dynamic indexing icon on the screen that allows the user to customize an index of selected words and terms, and definitions of those words and terms to an index list for the open book.

The methods and systems can include a dynamic table of contents icon on the screen that allows the user to customize a table of content of sections and chapters and parts of the open book.

The methods and systems can include a sticky notes icon on the screen for allowing the user to customize note pages with material on any selected page of the open book.

The methods and systems can include a hiding icon on the screen that allows the user to selectively block out portions of words, phrases, paragraphs, details of any page of the open book at any time.

The methods and systems can include either or both a quiz me icon on the screen that allows the user to selectively take interactive tests on any section and chapter of the open book, and a tutor me icon on the screen that allows the user to be interactively tutored with additional teaching materials on any section and chapter of the open book.

The methods and systems can include either or both a lecture me icon on the screen that allows the user to be lectured with additional teaching materials on any section and chapter of the open book, and a show me design icon on the screen that allows the user to selectively be shown additional designs in any page and any section and chapter of the open book.

The methods and systems can include either or both a seed generator icon on the screen that allows an instructor to selectively insert a different value for at least one problem or design in the open book, and a seed generator icon on the screen that allows an instructor to selectively insert a random generated value for at least one problem or design in the open book.

The method and system can include running the computer platform on a Java® Virtual Machine program.

Further objects and advantages of this invention will be apparent from the following detailed description of the presently preferred embodiments which are illustrated schematically in the accompanying exhibits.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

An identification of the components will now be described.

1. Main screen of digital book
2. left page screen
4. right page screen
6. flip page backward icon on left page
8. flip page forward icon on right page
10. left frame (backward flipping to different book chapters/sections)
12. right frame (forward flipping to different book chapters/sections)
14. upper horizontal toolbar
16. dynamic index icon
18. TOC (table of content) icon
20. bookmark icon
22. color themes icon
24. floating pages icon
26. highlight icon
28. sticky notes icon
30. supplemental images/material display icon
32. hiding icon
34. key points option feature
36. attachment icon
38. quiz me icon
40. Lecture Me icon
42. Tutor Me icon
44. Show Me Design icon
46. Practical Relevance icon
48. Seed generator icon
50. Solution methods buttons.
52. Levels buttons.
54. Symbolic/Numerical switching button.
100. Flip page flowchart
200. Dynamic Indexing Flowchart
300. Dynamic TOC (Table of Contents) Flowchart
400. Bookmarks Flowchart
500. Customized Color Themes Flowchart
600. Floating Pages Flowchart
700. Highlighting Flowchart
800. Sticky Notes Flowchart
900. Page Browsing Flowchart
1000. Implementing Chapters and Sections on Frames Flowchart
1100. Page Hiding Flowchart
1200. QuizMe Flowchart
1300. Tutor Me Flowchart
1400. Background Clock Flowchart
1500. Dynamic Cover Page Flowchart
1600. Opened page for Seed Generator Icon The invention is referred to in the figures and text as the novel interactive electronic book operating system and method, the invention or in many of the figures as the eBook.

The invention is a hardware and software independent system and methods that can be used with various computer based systems, and preferably, any computer-based system that runs the Java® Virtual Machine. The invention can operate on computer based platforms that include portable and hand held laptop type computers. The invention can operate on computer based platforms that include traditional desktop computers. A preferable screen for the computer based platform can allow for images of both left and right pages of open books to be easily readable on the screen. Additionally, the invention can work with a screen showing one open page of the digital book.

The operating system of the invention allows for digital books, preferably those types of educational text books having science, engineering and other technical topics to be viewed in their entirety on the single screen. The technical and science and engineering books preferably can include those that teach electrical engineering fields such as electronics, circuits, controls, signal processing, filters. etc. Additionally other scientific and technical digital books can be viewed on the digital screen, such as nonphysical and physical topics that include Physics, Chemistry, Mathematics, digital design, biology, anatomy, and the like, and all disciplines of engineering from industrial engineering, mechanical engineering, aerospace engineering, chemical engineering, nuclear engineering, electrical engineering, and the like.

The novel operating system has up to approximately 23 features as described below in reference to FIGS. 1-23.

FIG. 1 is an overview of a main screen 1 of the open digital book having a visible left page screen 2 and a visible right page screen 4, with unique icons arranged in tool type bars above, below and on the screen itself. While FIG. 1, shows the clickable type icons arranged in a preferred example, the invention can work with the clickable type icons located on different parts of the page images of the digital book itself, which will be described further on in relation to other figures below.

Figure 2:
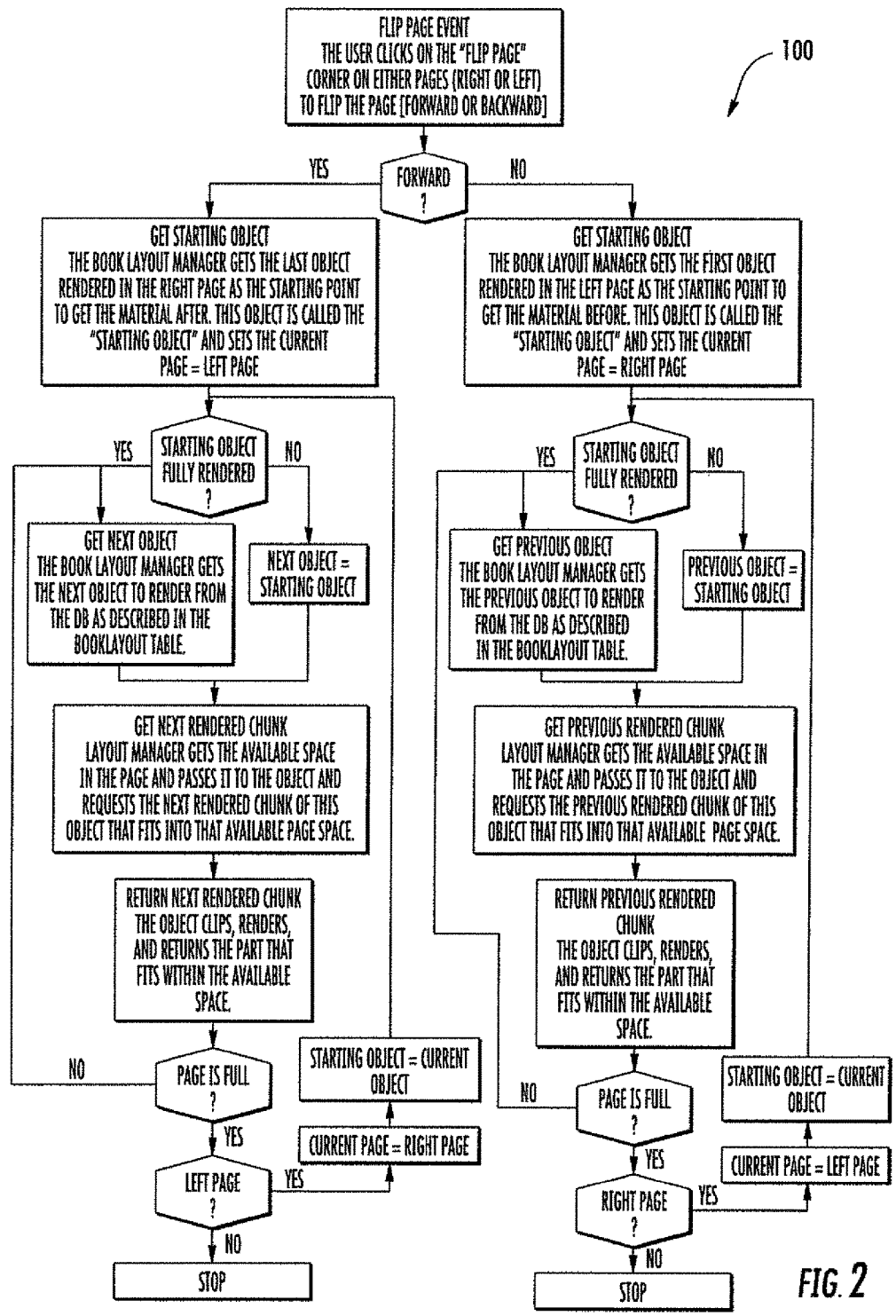
FIG. 2 is a flowchart for implementing page flipping.

1—Classical Book Look and Feel #1, 2, 4, 6, 8, 10, 12, 100 FIGS. 1-2.

The invention has the capability of inserting all objects as defined by scientific, engineering and technical book publishers. The user/reader can navigate forward 8 and backward 6, FIG. 1, and can enter an object ID (identification) and the book can directly render the object in the viewable two pages along with the objects in front/behind of that object. The book frames can reflect the current position of the book viewing by varying their thicknesses. Unlike most electronic books, the content of a book can be spread across in pages, and the user navigates through the book simply by flipping the pages the same way as a classical book having real pages.

1.1 Size (8.5"×11")

The book will be implemented as resizable window. A preferable screen size will replicate up to 8.5"×11" or larger.

1.2 Frames

Sides of the book (See Feature 12 below)

1.3 Page Navigation #6, 8 FIG. 1.

Flip forward and Flip Backward are implemented for two object types (text, image and other complex objects):

Implement navigation for other object types (Circuits, Examples, Tables, etc.)

Implement a random location flipping (compared to sequential flipping), like in bookmark or index.

See FIG. 2 for the flowchart implementation. Please note that the speed of page flipping will be given in Feature 10 below.

1.4 3-D Effects (Page Thickness, Visual Effects as the Page is being Flipped, Etc)

Increase/decrease of frame's thickness based on current flipping location.

1.5 Write/Scratch/Underline on the Pages

Free style writing, saves the scratches when the user leaves the page, "erases" scratches from the page.

Referring to 6, 8, 10, 12, 100 FIGS. 1 and 2, the content of the books can be spread across in pages and the user can navigate through the book by simply flipping the pages the same way they would do so if it was a classical book. The book images also reflects in 3D (three dimensional) effect the thickness 10, 12, FIG. 1 of the pages at both sides according to the page opened. Similar to classical books, this book images allows the ability to write, scratch or underline on any place on the book page images.

2—Dynamic Index with Hyperlinks 16, 200 FIGS. 1, 3, 4A-4C, 5A-5F

Figure 3:
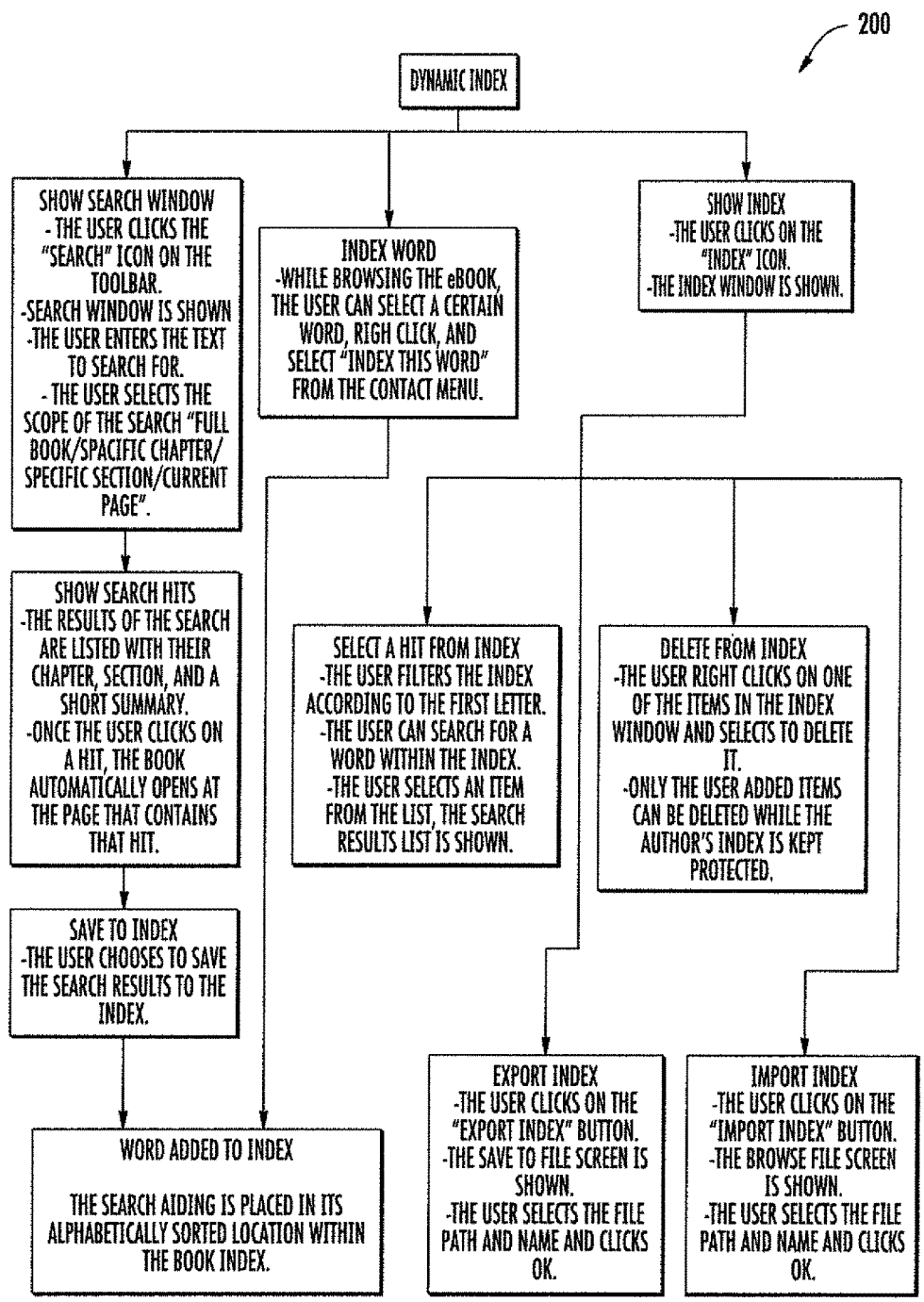
FIG. 3 is a flowchart for implementing Dynamic Indexing.

This feature initially was meant to resemble the Index at the end of scientific books. FIG. 3 shows the flowchart for its implementation. The interactive electronic book operating system and method supports two distinctive features:

1. Search for word: does not imply saving search results, if the user wish to instantly find a phrase she remembers from book, the search is the best choice. The results will be shown in a list view, but it would take some time to perform full text search in the novel invention content. The novel interactive electronic book operating system and method can also allow the user to restrict his search to specific chapter/section, and support also wildcard characters (? for single and * for many). This feature is memory-less, once the user close the search results, the search may be erased.

2. Index word: The user has the option to save the search for future use; it gives faster access to the word exactly as Index does. Once the search results are indexed, they will be recorded into the database and the user can access them quickly in subsequent searches.

Referring to 16, 200 FIGS. 1, 3, 4A-4C, 5A-5F, rather than having a static index precompiled for a digital book, this feature allows the user to right click on any word within the text and add it to the index. The moment the word is added to the index, the invention engine searches the whole text for that word and associate links to the places in the index. Links can show bubbles with brief descriptions once the cursor moves over it.

2.1 Search

Figure 4A:
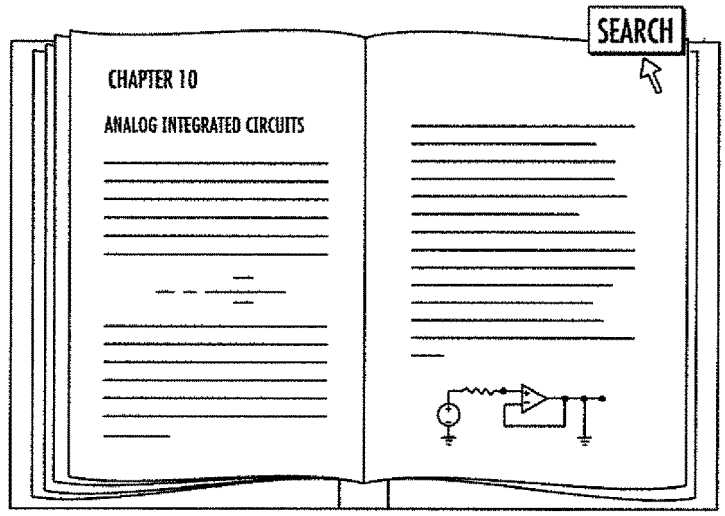
FIGS. 4A, 4B and 4C show different steps associate with clicking a search icon.
Figure 4B:
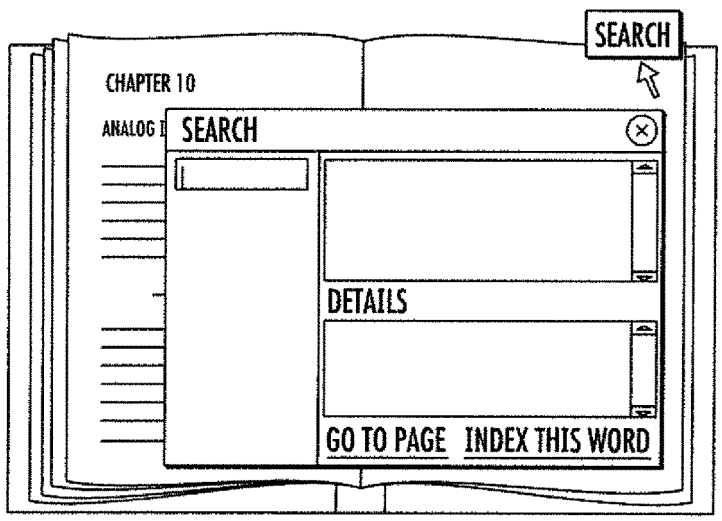
Figure 4C:
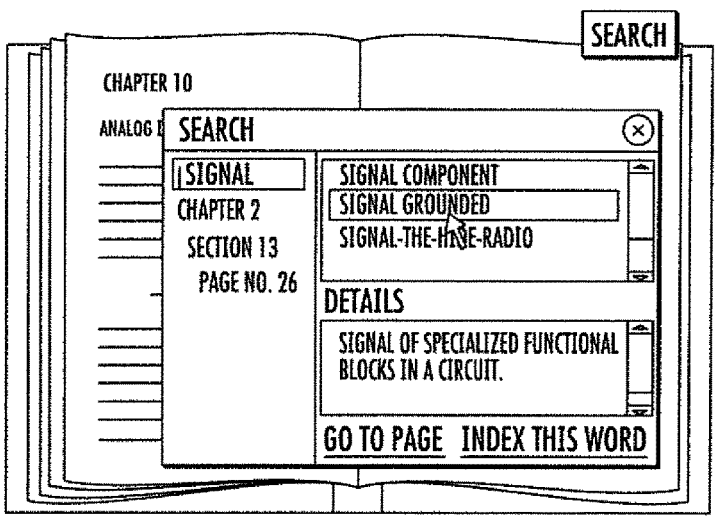

The simulated images for the search features are shown in FIGS. 4A, 4B, 4C.

The Search sub-features are listed below in reference to 16 FIG. 1 and FIGS. 4A-4C:

2.1.1. The user can open the search window and enter a search string (text and wildcard characters) to look for a word; the search can be restricted to specific chapter, section and currently shown pages. Full search of the novel interactive electronic book operating system and method, has to be performed and any occurrence of the word should be recorded into the database for future access.

2.1.2. Users will be warned not to index common words (the, a, is, has, have, do etc.). Also, default index created by the publishers (Mesh, loop, Voltage, Current, power, etc.) will be created.

2.1.3. The search window is basically a List View that contains the section/chapter of all hits, along with the context of each hit to give the user a clue if this is what he is looking for.

2.1.4. Once the user double clicks on any hit, the novel interactive electronic book operating system and method can open the page that contains that hit and highlight the occurrence for the user.

2.1.5. The user can "save" this search into the invention Index by clicking a button (Index this word) that appears on the search List View. The novel interactive electronic book operating system and method has to add the word to the Index list and store all hits into the database so that the subsequent accesses can be accomplished faster.

2.2 View and Search Index (1) (Shown in Reference to FIGS. 5A-5F)

Figure 5A:
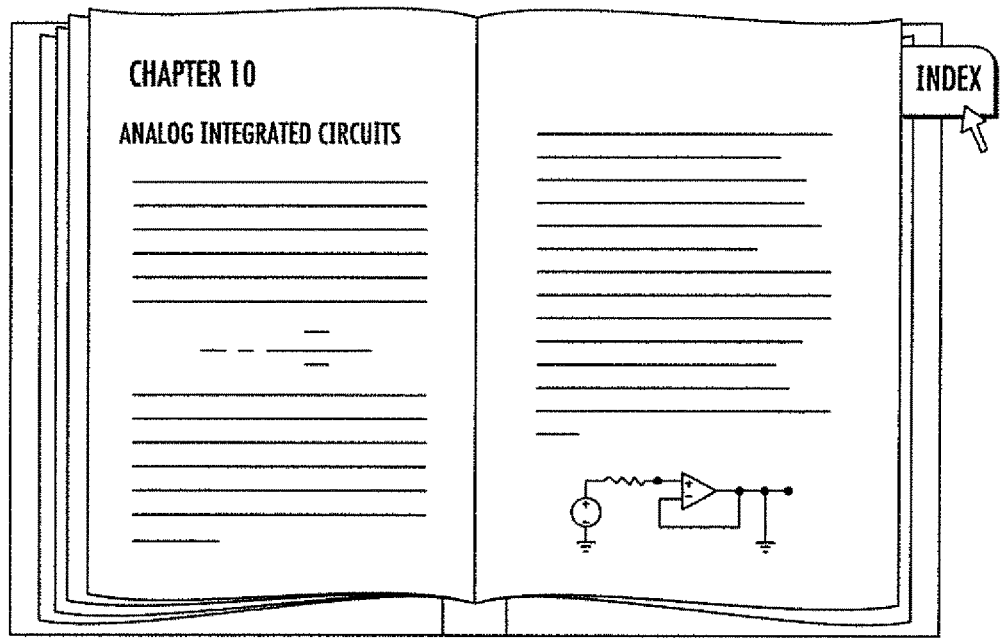
FIGS. 5A, 5B, 5C, 5D, 5E and 5F show a dynamic index feature.

2.2.1. User can Click (Index) to show an alphabetic-ordered List View (As seen at the end of scientific books) of all the indexed words. (FIG. 5A)

Figure 5B:
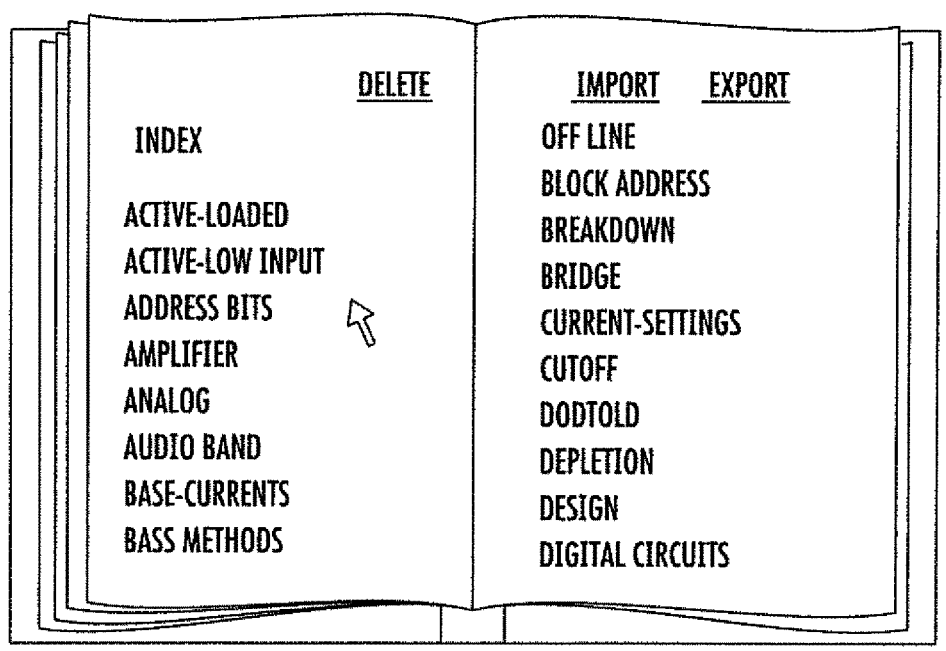

2.2.2. The user can filter on a specific letter (drop down box or links to all alphabetic letter) to cut the view into that specific letter only. The user can also search for a word in the index itself. (FIG. 5B)

Figure 5C:
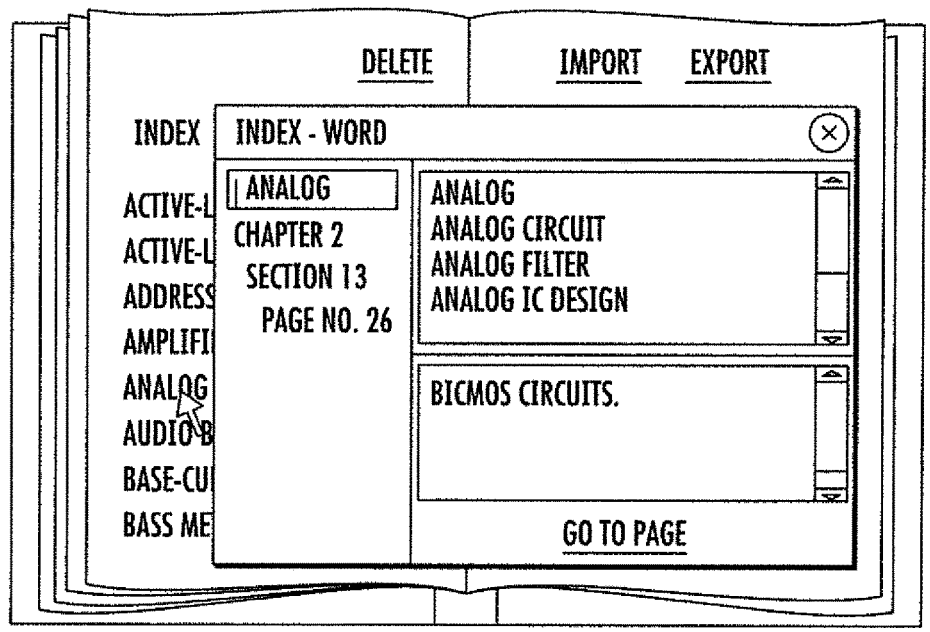

2.2.3. Once the user double clicks a word in the Index, the same search window described in Section 2.1.3 will be displayed, and the action described in 2.1.4 will be enabled also. (FIG. 5C)

Figure 5D:
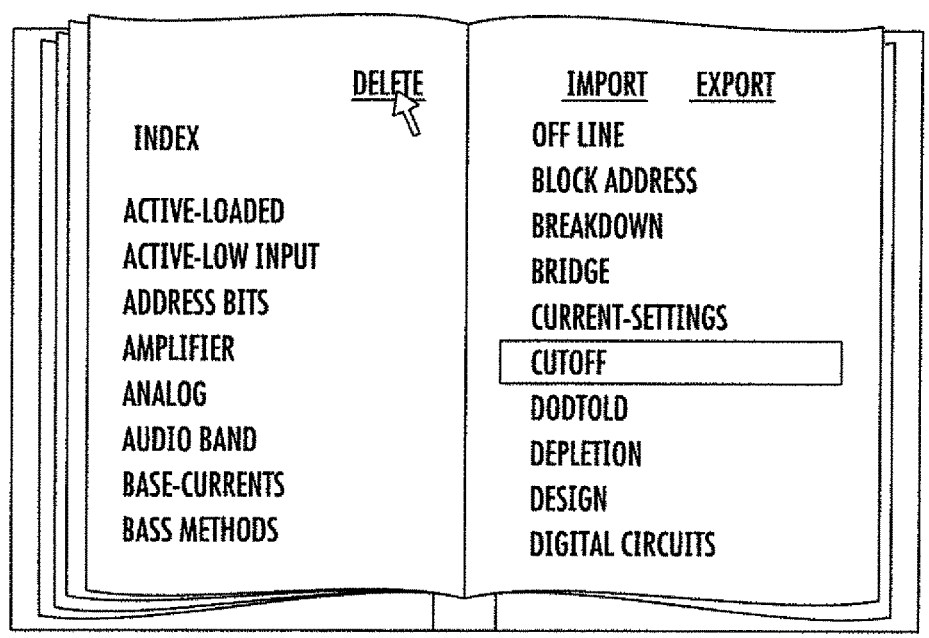

2.2.4. The user can delete the word from the index by selecting it and clicking the (delete) button. We might prevent the user from deleting any word from the publisher's index (to be discussed). (FIG. 5D)

Figure 5E:
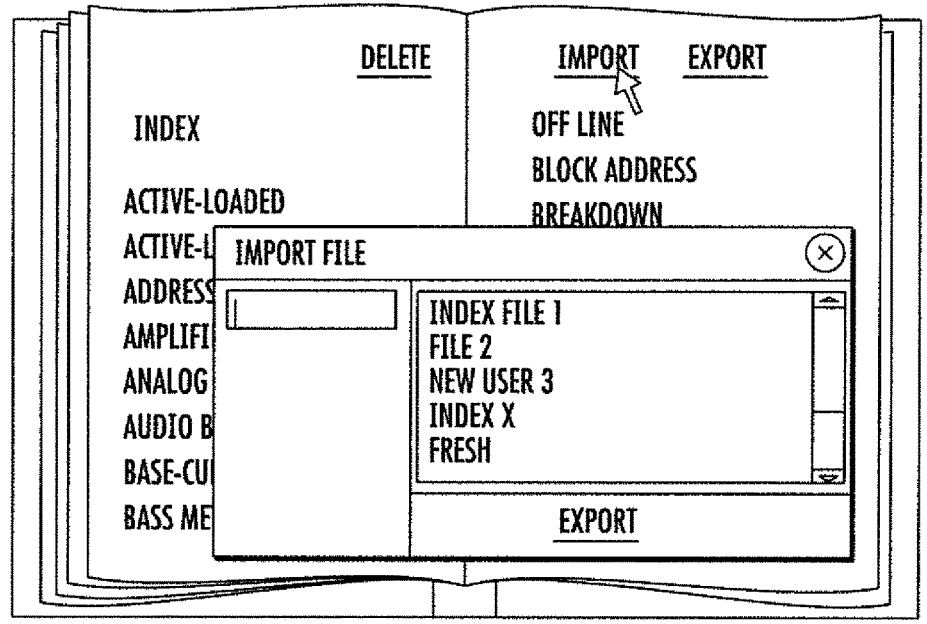

2.2.5. Import/Export Index will be implemented. (FIG. 5E)

Figure 5F:
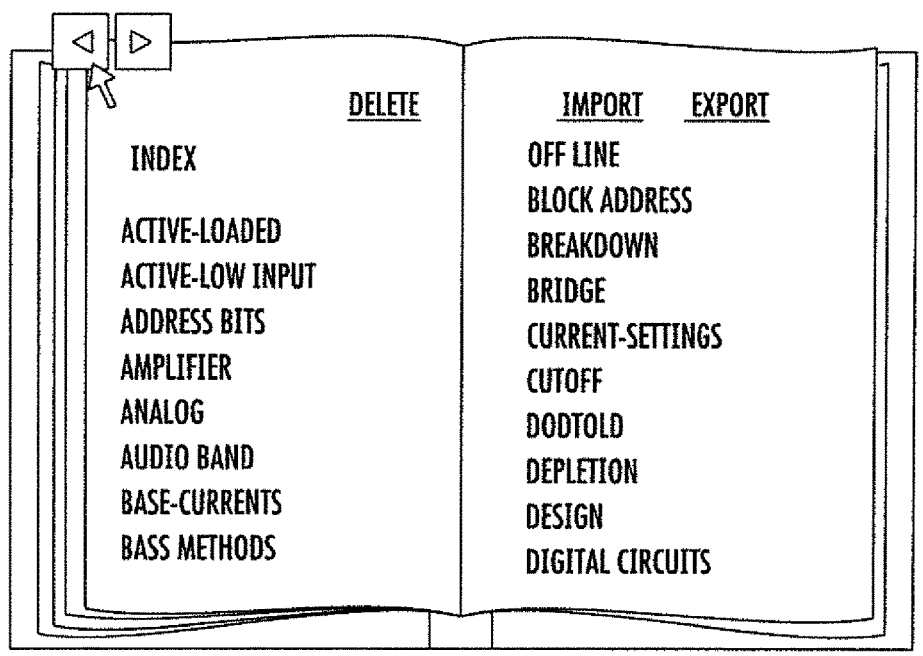

2.2.6. Add back and forward arrows to get back to the original location while navigating through the search results. This is because the user might need to get back to where he originally was before performing the search. (FIG. 5F).

Referring to 16, FIGS. 1, 3, 4A-4C, 5A-5F, rather than having a static index precompiled for a digital book, the novel interactive electronic book operating system and method allows the user to right click on any word within the text and add it to the index. The moment the word is added to index, the invention engine searches the whole text for that word and associate links to these places in the index. Links can show enlarged bubbles with brief descriptions once the curser moves over.

3—Dynamic Table of Content 18, 300 FIGS. 1, 6 and 7A-7C)

Figure 6:
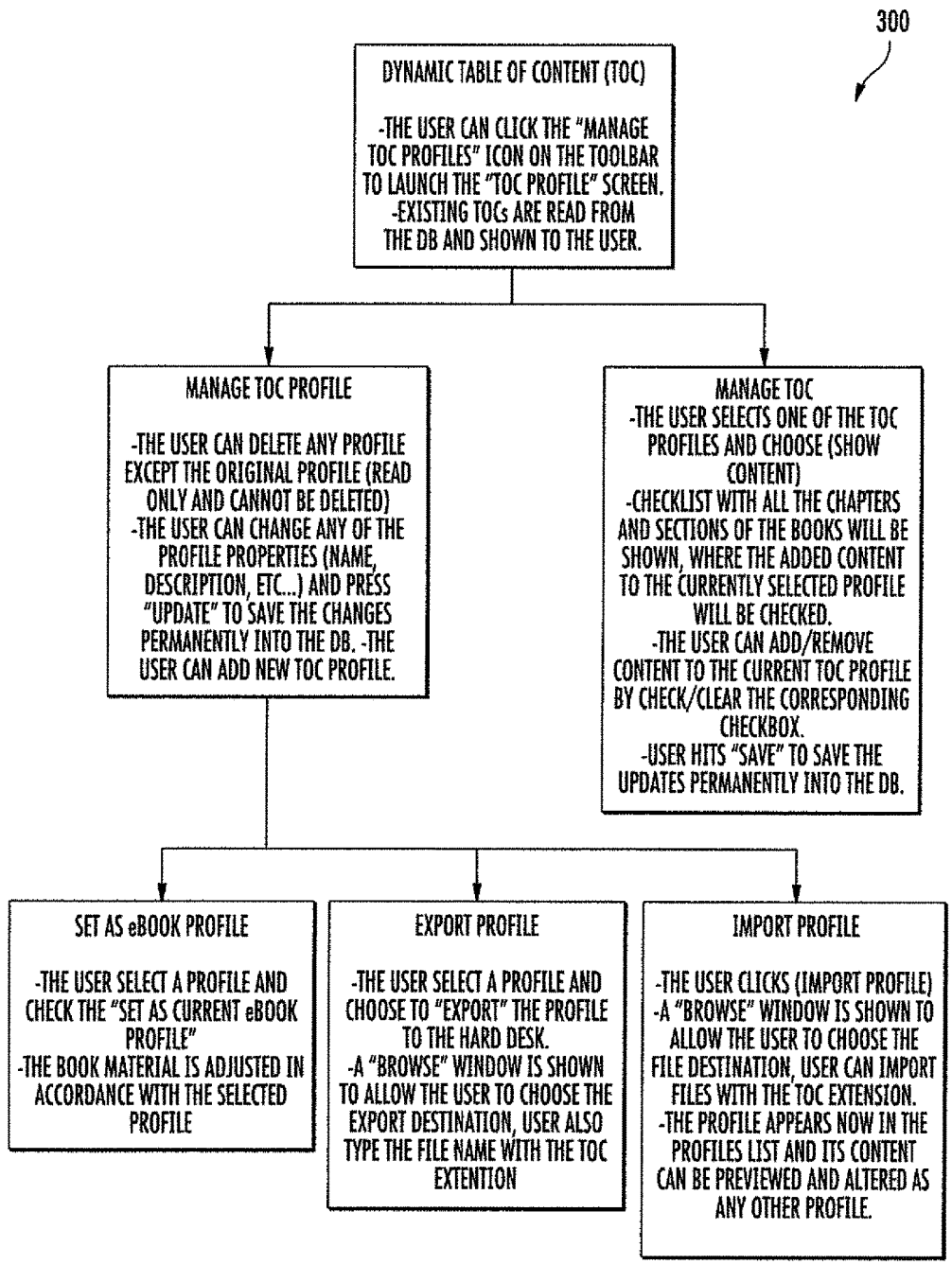
FIG. 6 is a flowchart for implementing a Dynamic TOC (Table of Content).
Figure 7A:
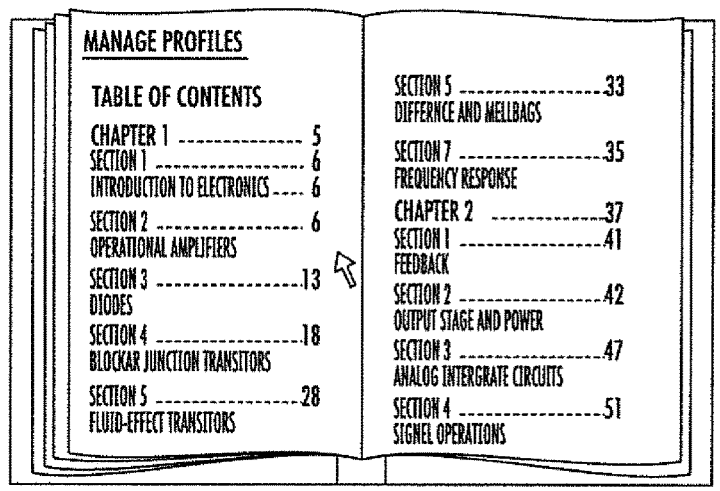
FIGS. 7A, 7B, and 7C shows manage table of contents management features
Figure 7B:
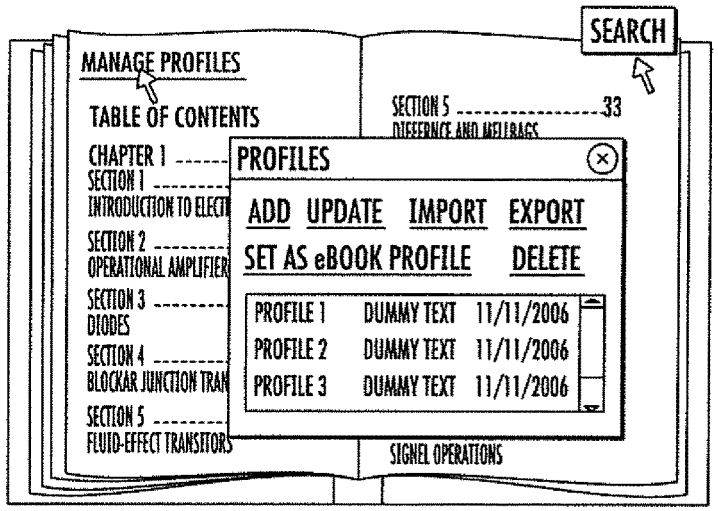
Figure 7C:
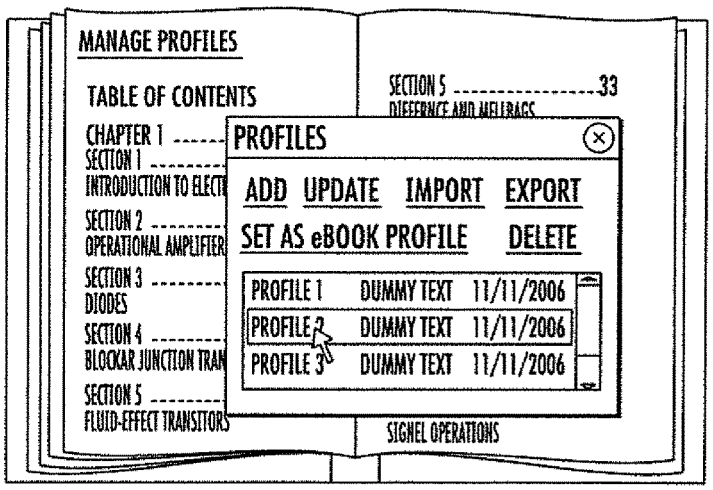

The novel interactive electronic book operating system and method has to read its "viewable" content dynamically from the current Table of Content (TOC) Profile. FIG. 6 shows its flowchart to carry out implementation. This profile can be loaded by default at the launch, of the novel operating platform; it will remain as default profile unless the user wants to change it.

The invention can use the word profile to refer to the dynamic TOC, although we might consider expanding the term (profile) to refer to all the user settings and preferences remembered by the novel operating platform (Colors, themes, TOC, etc.)

The sub-features are listed below 3.1 to 3.5:

3.1 View Profiles (1)

The user can click on "Manage profiles" to open a List View of all profiles, the preview should be a Master/Detailed one, where the first list shows the profiles (Name, Description, Creation Date, Last Modified, etc.), and the detailed view shows the TOC details once the user selects a specific profile. See FIGS. 7A, 7B and 7C.

3.2 Delete Profile (1)

The user can select a profile and delete it, this will delete the metadata stored to describe what to show from the novel electronic book operating platform content, and it will not touch the data though. There must be a Default profile defined that cannot be deleted and which contains the whole book material. Profiles which are defined by the authors should be protected and the user cannot delete them 3.3 Add/Update Profile (1)

This enables the user to Add/Remove content to/from the viewable contents of the novel interactive electronic book operating system and method.

3.4 Set as eBook Profile (1)

Selecting a profile and clicking (Set as eBook profile) makes that profile the active one, the database of the invention has to be updated to reflect the new profile.

3.5 Import/Export Profile (1)

The user can Export a TOO profile into an external file (.TOC), and can import it into other stored books. The information of the TOC will be added to the Master/Detailed List View and can be handled as described above. Each .TOC file must target specific book (circuit, electronics, DSP, etc), so it has to store a reference to the book that "exported" it.

Referring to 18, 300 FIGS. 1, 6 and 7A-7C, having inherently layered adaptive content, the content of a digital book can be customized by the user either by selecting predefined profiles ("Table of Contents"), or by customizing any profiles by adding or removing any of the available set of content. For example, if the digital book is an Electronic Circuit Book about electronic circuits, electrical engineering students can be exposed to more details, sections and chapters than a mechanical engineering student would be from the same textbook.

The user can also import the customized table of content being exposed by another user. This feature is mainly helpful in the sense that the instructor designs their course by customizing the table of content of the book, and then exports it into a file that then later imported by their students to reflect the syllabus of the course.

4—Bookmarks 20, 400 FIGS. 1 and 8, and 9A-9C

Figure 8:
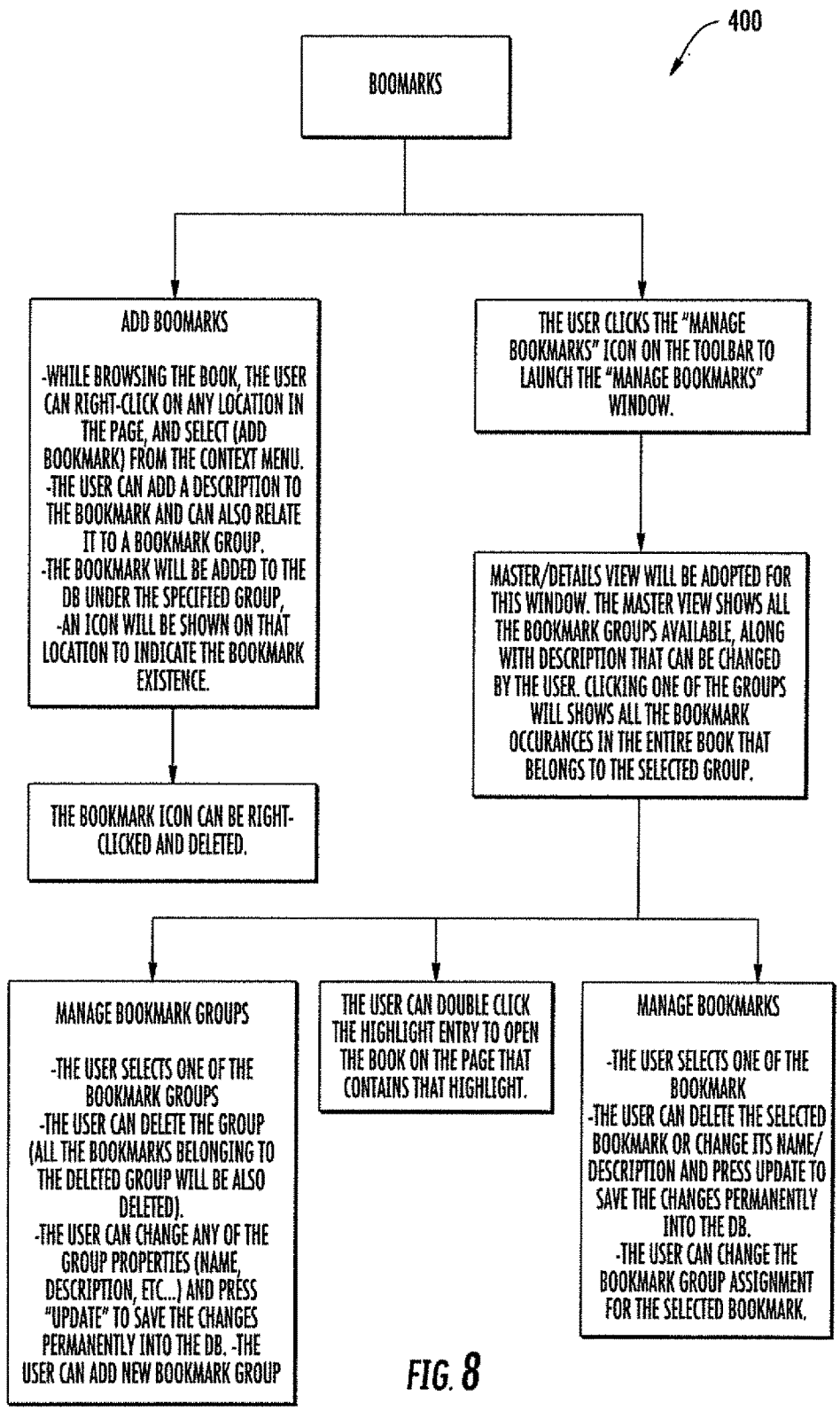
FIG. 8 is a flowchart for implementing Bookmarks.
Figure 9A:
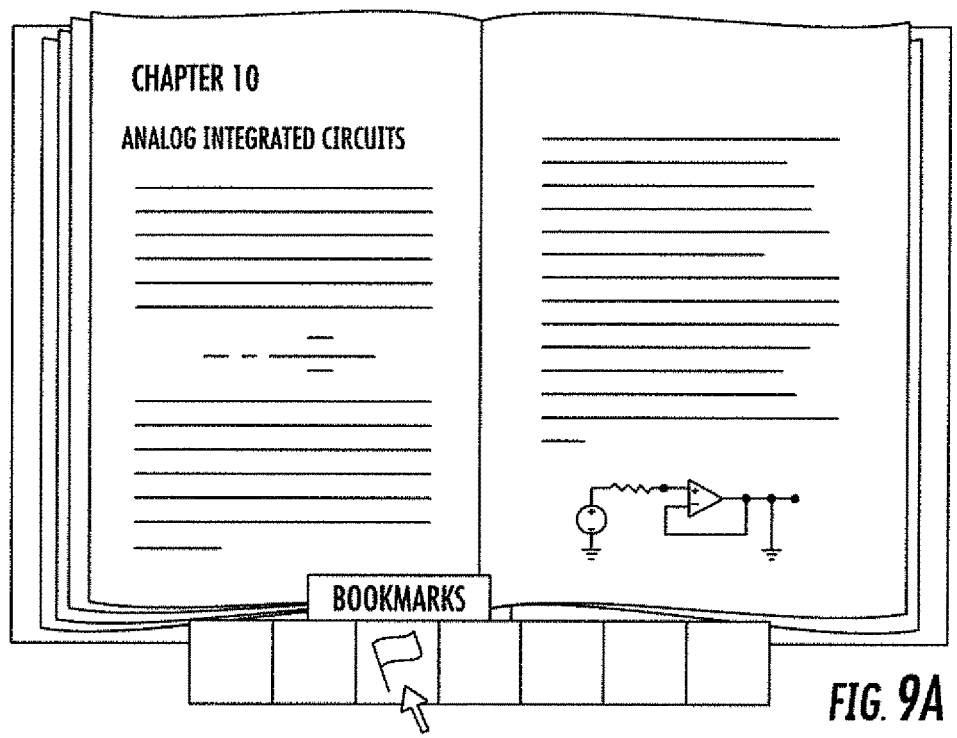
FIG. 9A shows adding a bookmark.
Figure 9B:
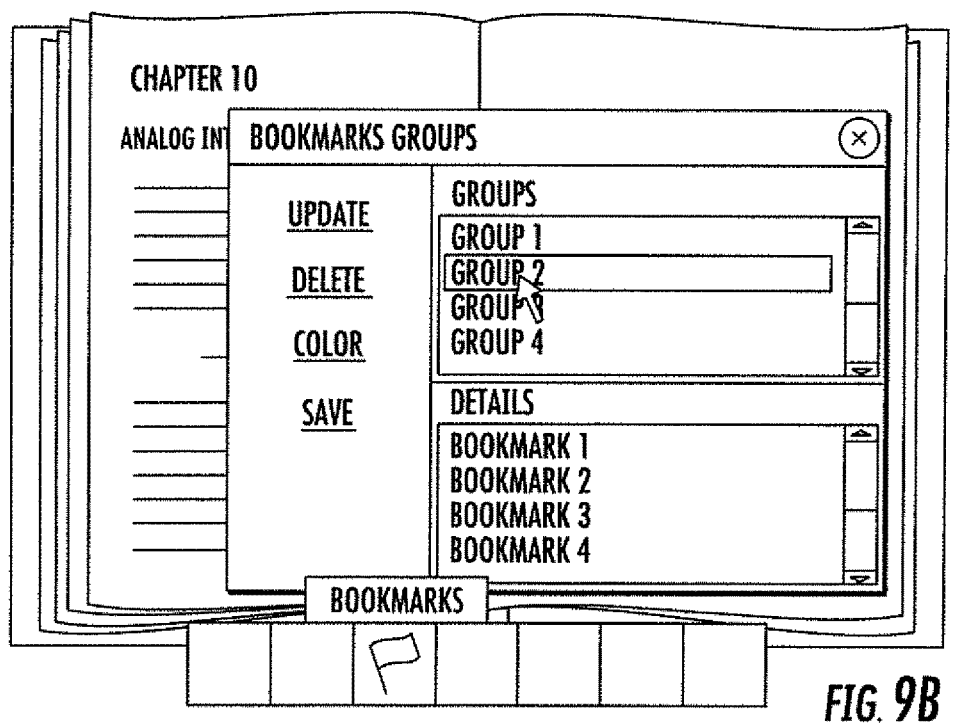
FIG. 9B shows searching for bookmarks.

Bookmark groups (baskets) can be defined by the user to refer to logical grouping of her bookmarks (Things to remember before the exam, Things to ask the teacher in office hours, etc.). Bookmarks can be added to each bookmark basket. FIG. 8 shows a preferred flowchart to carry our implementation of bookmarks. Sub-features are described as follows in 4.1-4.4:

4.1 View Bookmarks (1) (FIG. 9B)

A master/details view for all the bookmark baskets (master view) along with their bookmarks (details view). Clicking on a bookmark 20 FIGS. 1 and 9A should take the user to the location of the bookmark. The bookmarks can be sorted by name or location.

Figure 9C:
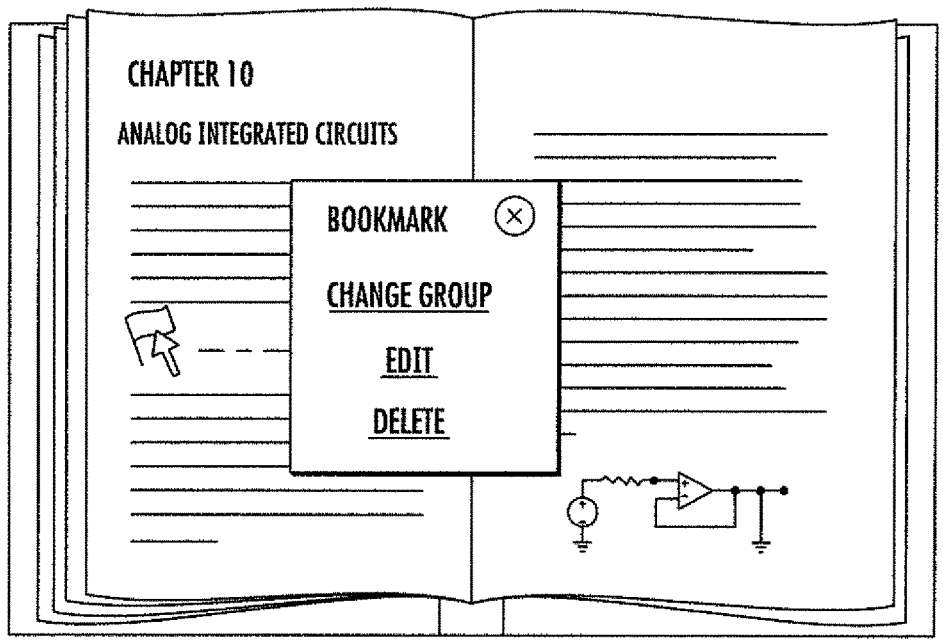
FIG. 9C shows editing/deleting book marks.

4.2 Manage Bookmark Groups (1) (FIG. 9C)

From the view described in 4.1, the user should be able to Add/Delete/Update bookmark baskets.

4.3 Add Bookmark (2) (FIG. 9A)

While browsing the book, the user can add bookmark anywhere by placing it over any text or image, or any other object. The invention prompts the user to decide into which basket the bookmark should be added, and whether it is hidden or viewed (to be discussed).

4.4 Delete Bookmark (1) (FIG. 9C) The user can delete the bookmark from the Bookmark list view described in 4.1.

Referring to 20, 400 FIGS. 1 and 8, and 9A-9C, the user can bookmark a part of the page, a complete page, or multiple pages. The bookmarks can be organized in groups. Then the user can go to a certain bookmark group and view whatever content they added to that group. A good example of the usage of such a setup can be a bookmark group for exam review where the user adds all important material to be reviewed before the exam.

5—Customized Color Themes 22 500 FIGS. 1, 10 and 11A-11C

The invention supports generally predefined themes that fit all moods and all personalities. For example, we can support classical book theme in which Black-White-Gray degrees are used, other modern themes for young students, something for girls will be cool as well, and so on.

Figure 10:
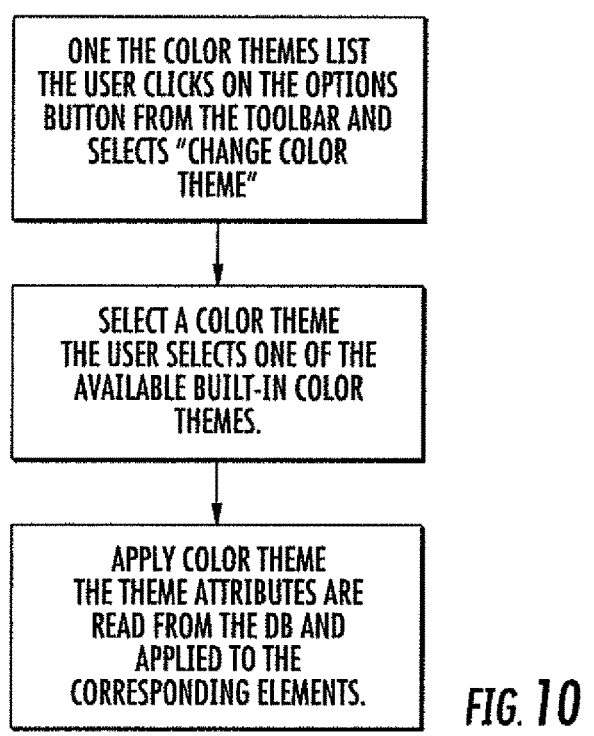
FIG. 10 is a flowchart for implementing Customized Color Themes.
Figure 11A:
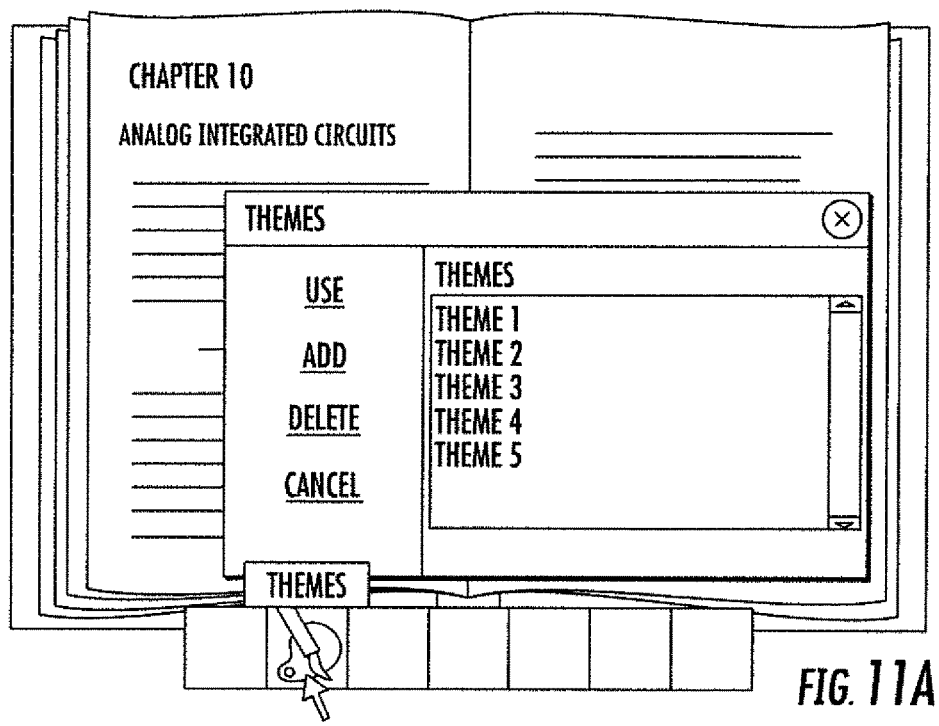
FIG. 11A shows a list of customized color themes.
Figure 11B:
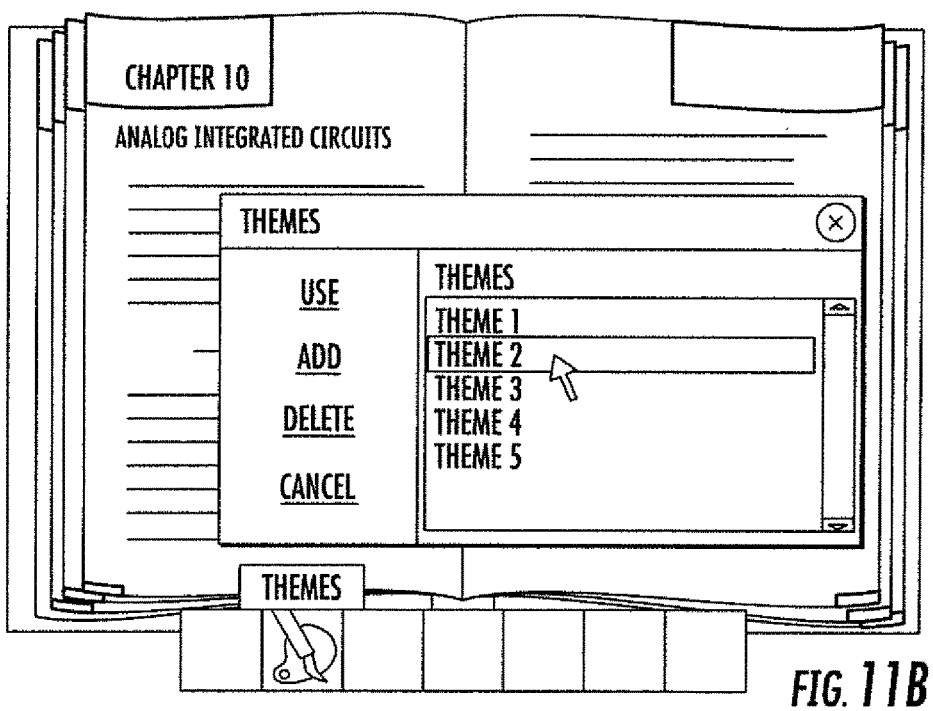
FIG. 11B shows a selected color theme for the above-mentioned color change.

The invention feature for customized color themes will support dynamic color and font changes. FIG. 10 shows its flowchart to carry our implementation.

Referring to 22 500 FIGS. 1, 10 and 11A-11C, the font, background, headers, and all items' colors and themes can be customizable and can be changed on the fly to suit the users desires and needs.

6—Floating Pages 24, 600 FIGS. 1, 12, and 13A-13C.

Floating pages is a feature that requires intensive graphical effort to make it look impressive. The internal logic is fairly simple provided that the floating pages are only copies of the original image. There is no mean of (cutting) a page from the book and putting it beside, while photocopying a page makes more sense. The browsing in the invention will remain the same.

An important note here is that the rendering of pages might not be the same every time. Thus, taking a floating page out does not mean that it will happen the same way every time in the invention itself.

Floating pages can be saved into the Data Base (DB) for later use when needed.

Sub-features of the floating pages are discussed as follows in 6.1-6.4:

6.1 Take Out a Floating Page (1)

Figure 12:
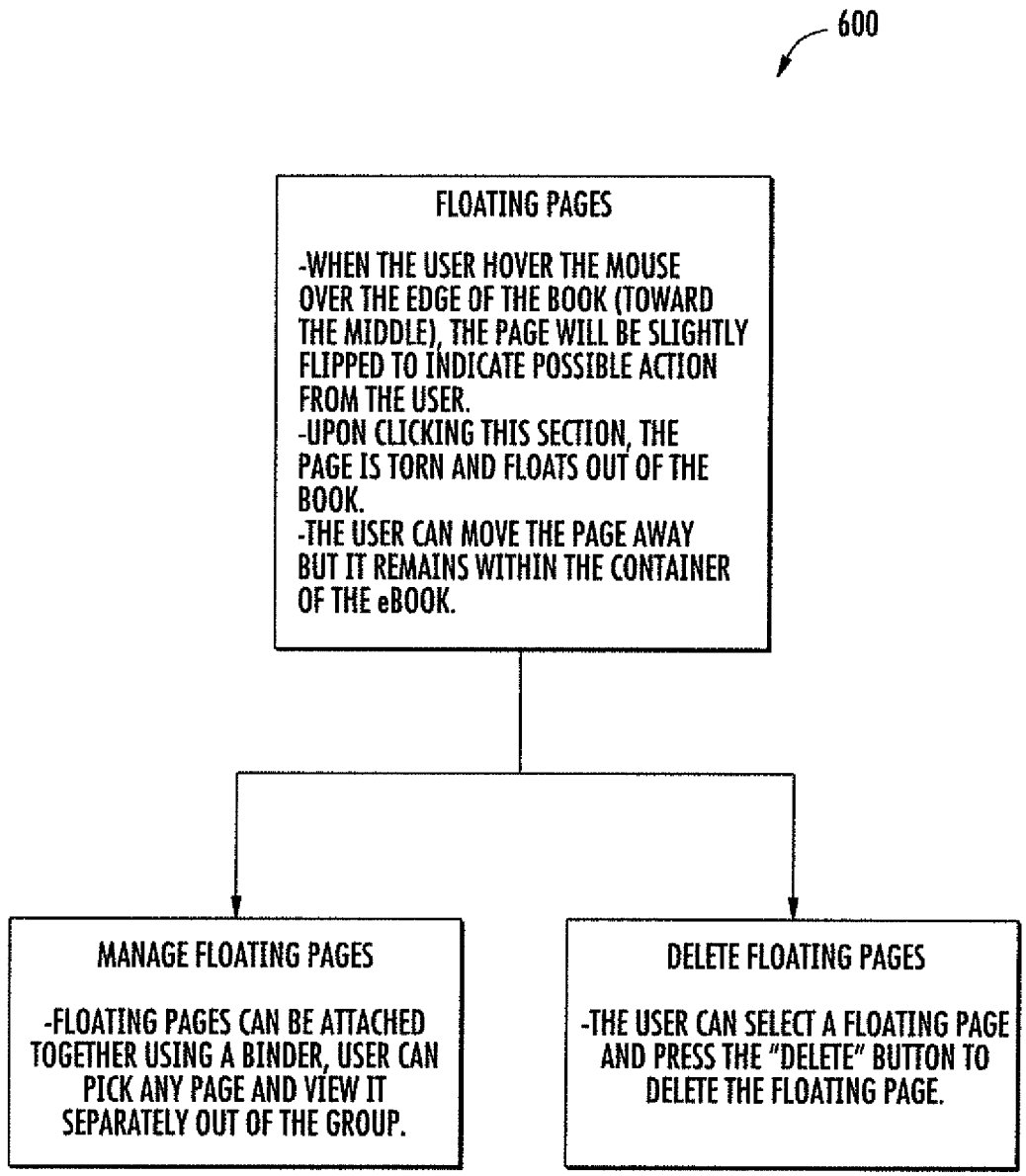
FIG. 12 is a flowchart for implementing Floating Pages.
Figure 13A:
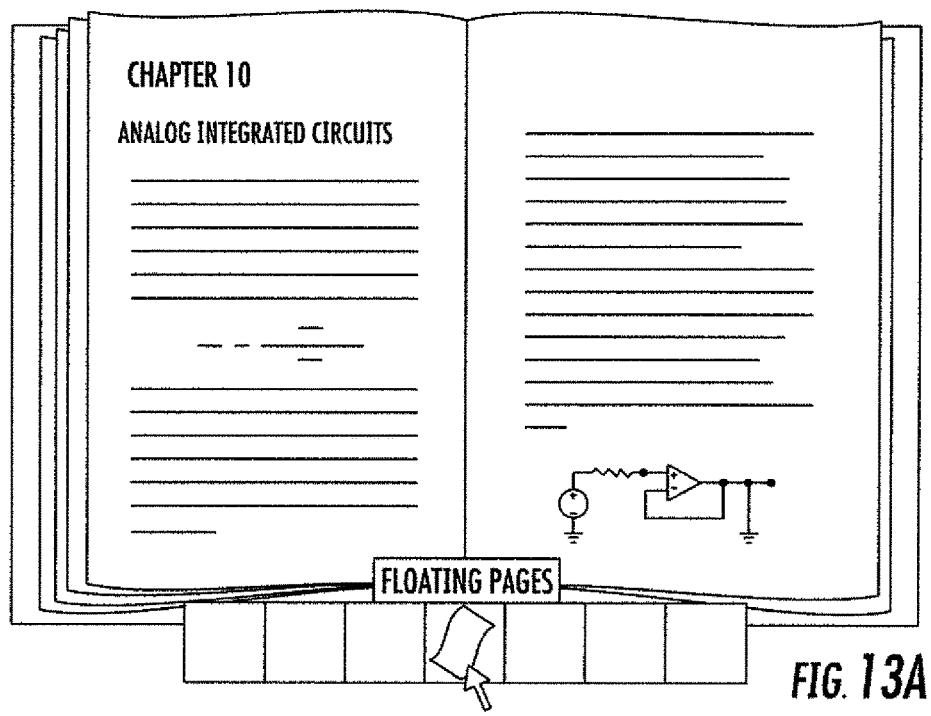
FIGS. 13A and 13B show creating a floating page.
Figure 13B:
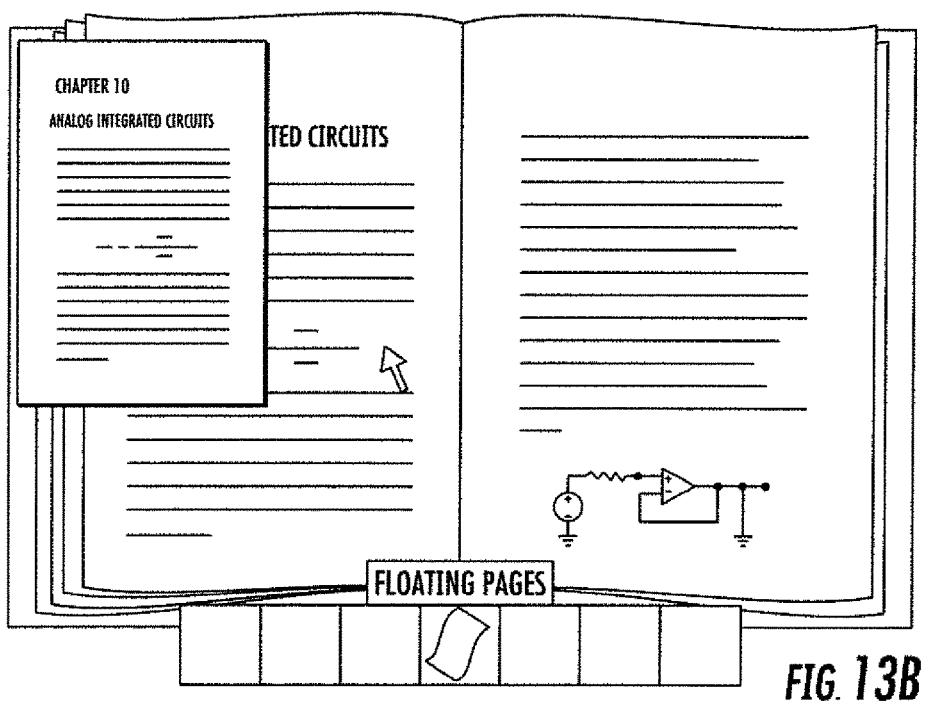
Figure 13C:
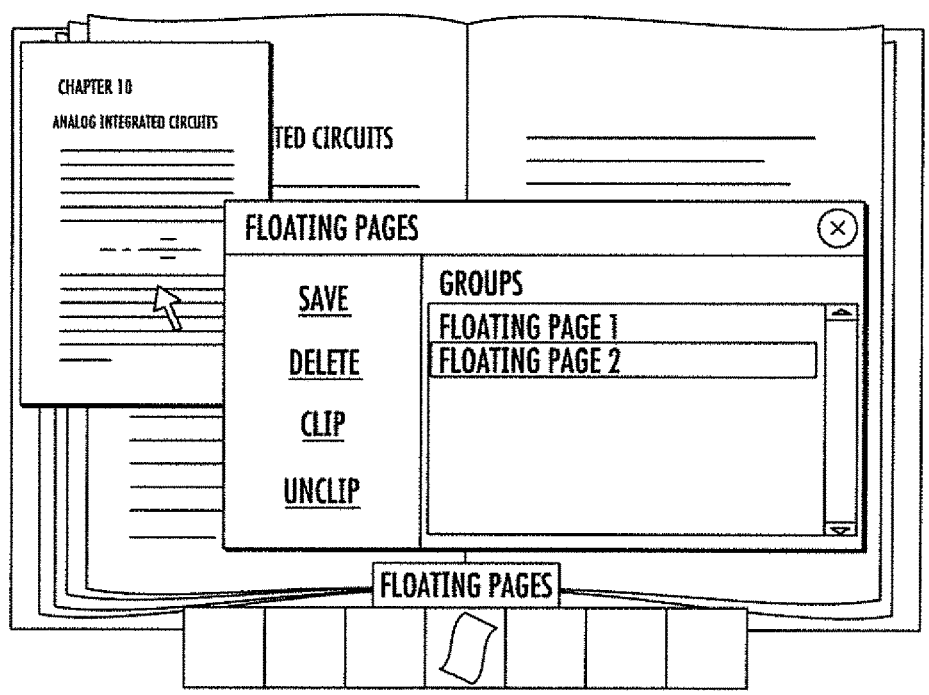
FIG. 13C shows managing floating pages.

The user can take out the right or left page and make it floating page, this will create another page instance (keeping the book as it is). The user can move the floating page as another window, as a movable image rendered over the eBook, etc.). FIG. 12 shows its flowchart to carry our implementation.

6.2 Save Floating Page (1)

The user can click and save a floating page so she can open it in later runs of the invention 6.3 Delete a Floating Page (1)

The user can delete any floating page.

6.4 Organize Floating pages (1)

This is the floating page container (clipped together), here the user can browse them, unclip anyone of them and take it out, hide/show, etc.

Referring to 24, 600 FIGS. 1, 12, and 13A-13C, as the user might need to keep part of a page open and visible but at the same time navigate through the other pages to see related content, the user can select the page they want to keep visible to float on top of the book. Followed by navigating through the book while keeping that page floating on top. These floating pages can be grouped in a clip that handy for viewing at any point while reading through the book. Moreover, these floating pages can be shown or hidden on demand.

7—Universal Support

The invention is hardware and software independent and can be run with any computer based system that preferably runs the JAVA® Virtual Machine. For example, the novel operating system framework of the invention can be run on any platform capable of running a light LINUX® kernel, including IPOD®, and the like.

Figure 14:
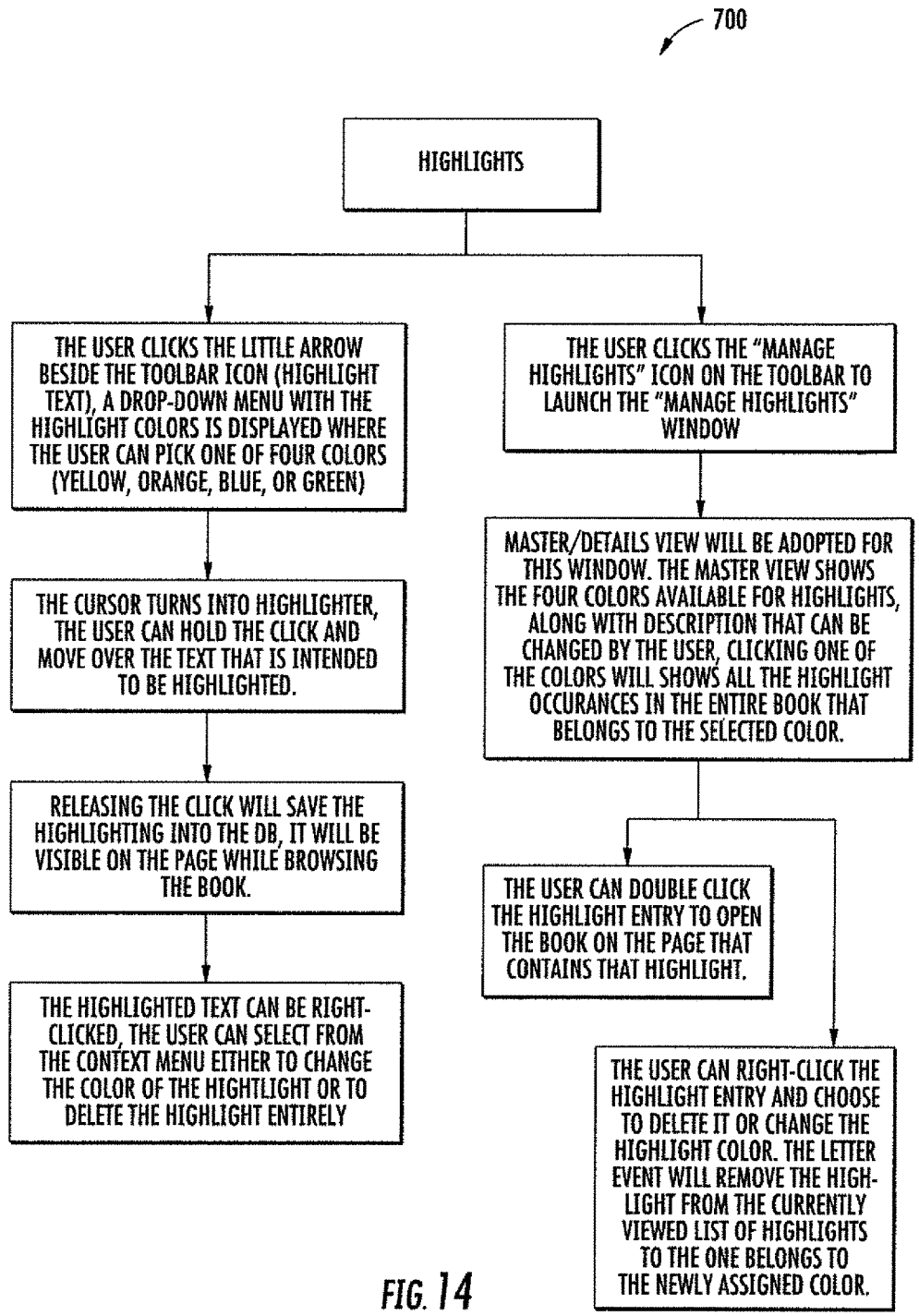
FIG. 14 is a flowchart for implementing Highlighting.

8—Highlighting 26 700 FIGS. 1, 14 and 15.

This feature is very similar in its requirement to the Bookmark feature, except that it lacks the idea of baskets, and adds the complexity of highlighting MULTIPLE objects (compared to bookmarking single location only).

8.1 Highlight Text (1)

The user may select text and highlight it, and the text can span multiple objects. More than one highlighting color may be used (defined by the theme as described previously in Feature 5). All the highlights in the invention can be controlled by a show/hide highlights option, this way the user can view his book without the highlights whenever he wants to.

8.2 Delete Highlight (1)

Once the Highlighted text is clicked, it should give an indication to the user that it is selected now. The user can change its color, and can delete it.

Referring to 26 700 FIGS. 1, 14 and 15, the user can highlight any part of the text, image, or item, or any combination of these parts of the digital book.

9—Sticky (Adding) Notes 28, 800 FIGS. 1, 16 and 17A-17C.

Notes are a small colored "piece of paper" that can be stuck into objects (text, image, etc.) and allow free editing. The purpose of this feature is to give the user the ability to write her notes and attach them to the proper place. FIG. 16 shows the flowchart to carry our implementation.

Figure 17A:
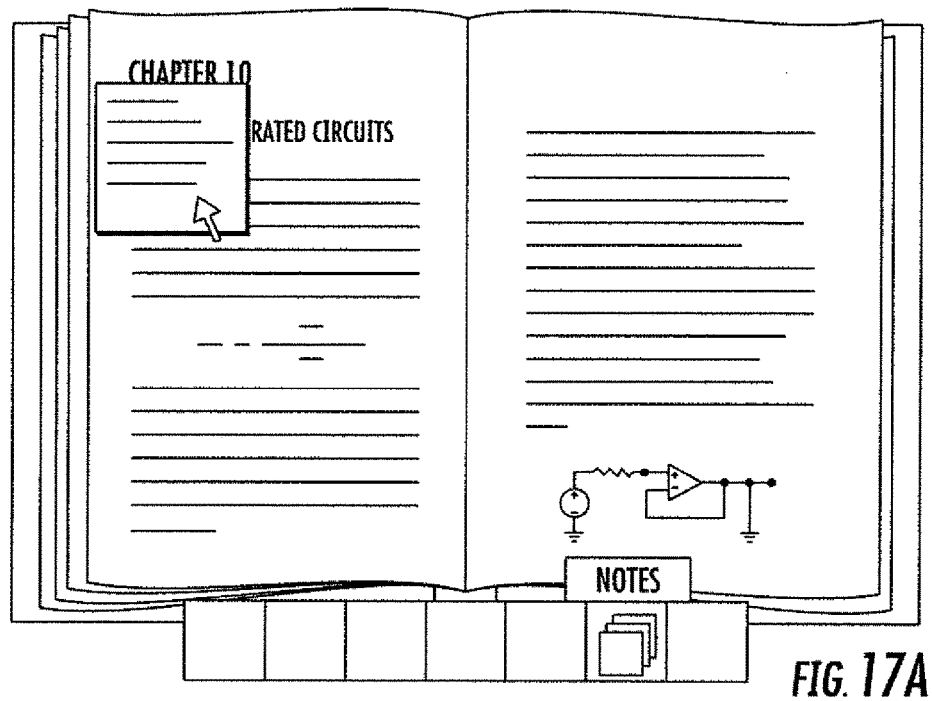
FIG. 17A shows creating a sticky note.
Figure 17B:
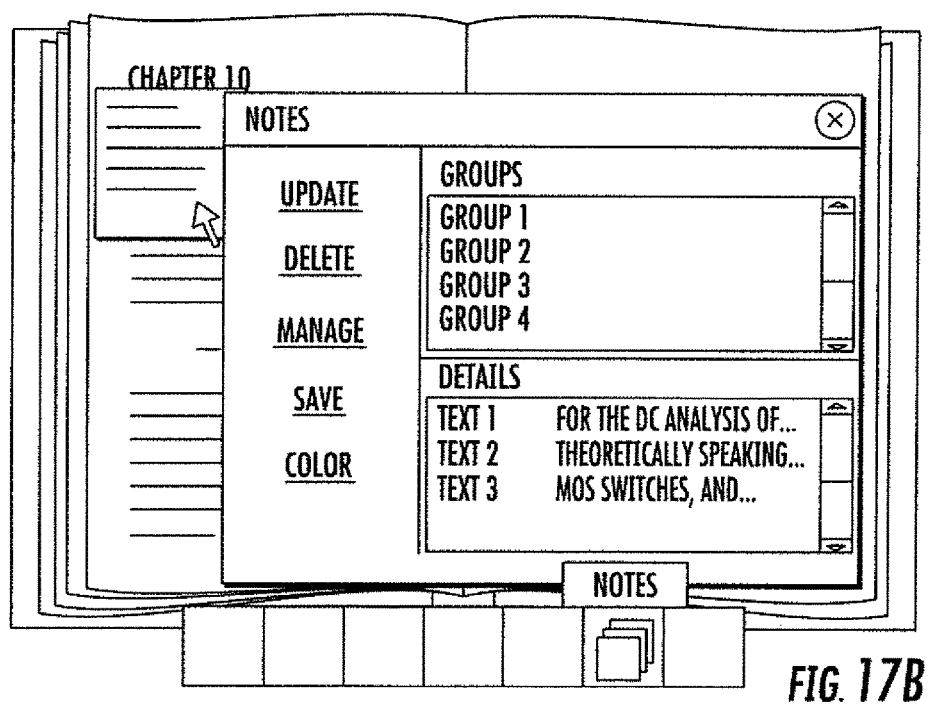
FIGS. 17B and 17C show managing a sticky note.
Figure 17C:
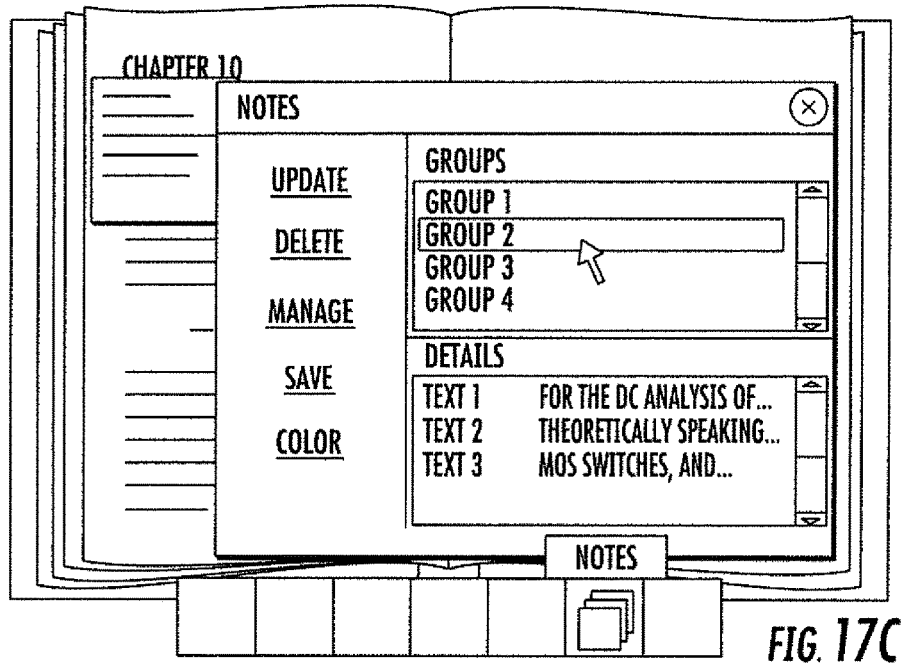

9.1 Create Note (1) (FIG. 17A)

The user may create a note, pick colors (Predefined per theme), and stick it to any object in the book. The note can be expanded/collapsed, and can be moved from one place to another.

9.2 Delete note (1) (FIG. 178, 17C) The user may delete a note.

9.3 Manage notes (1) (FIG. 178, 17C)

One main screen that shows a list of all notes defined in the invention. The user can delete/update notes from there, and can also double click a certain note to render the book opened on the page that contains the note.

Referring to 28, 800 FIGS. 1, 16, 17A-1.7C, the user can write notes and fix them to any place on the book for later reference and use.

10—Page Browsing at Different Flipping Speeds 6, 8, 900 FIGS. 1, 18 and 19A-19C.

Figure 19A:
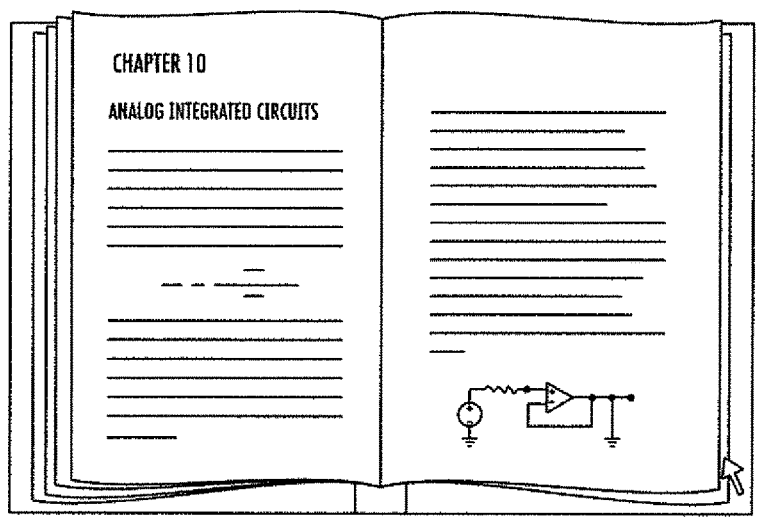
FIGS. 19A, 19B, 19C show page browsing at different flipping speeds.
Figure 19B:
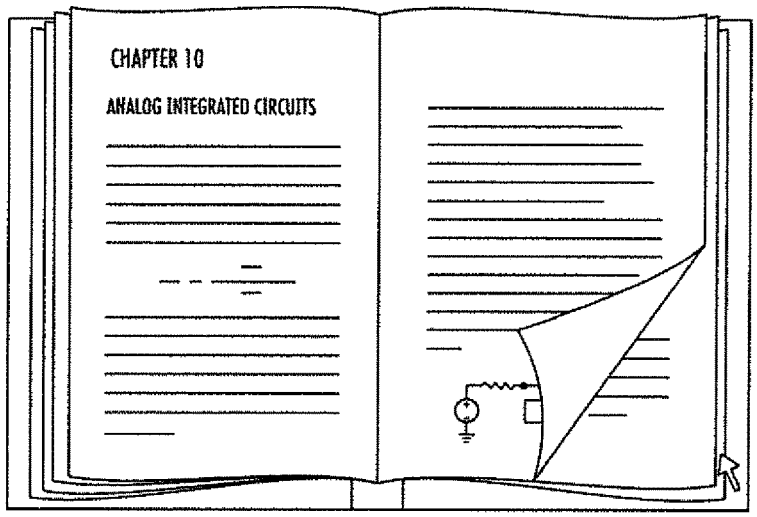

The longer icons 6, 8 are held down (clicked on), the faster the backward or forward page flipping speed occurs. Two sub-features are described here 10.1 and 10.2:

10.1 Page Flipping with Visual Effects (2) (FIGS. 19A-19B)

Figure 18:
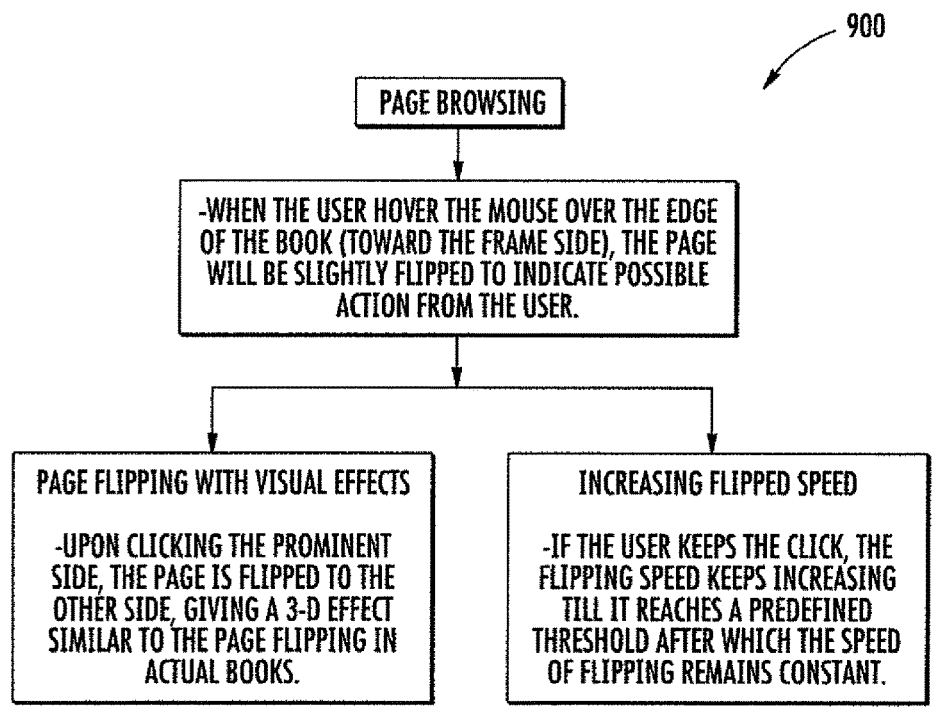
FIG. 18 is a flowchart for implementing Page Browsing at different flipping speeds.

This feature animates page flipping to look like a real book. The full transition of the page (right to left/left to right) may be smooth and realistic. FIG. 18 shows a flowchart for an example implementation.

Figure 19C:
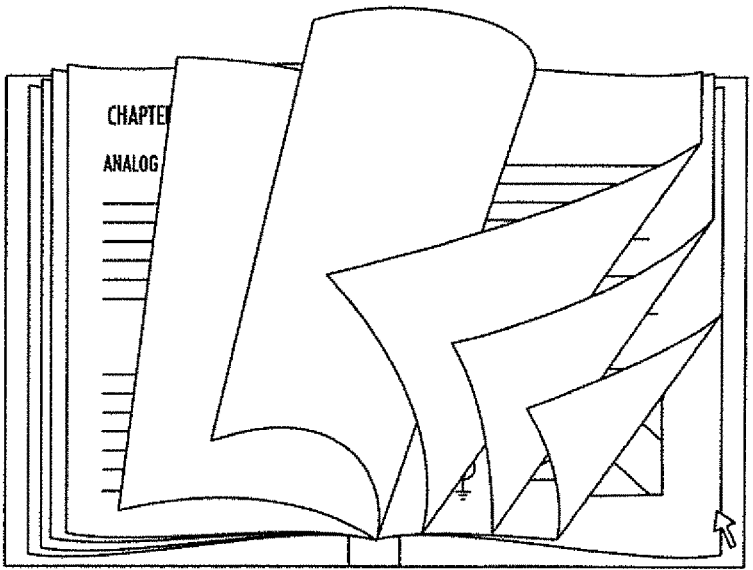

10.2 Increasing Flipping Speed (1) (FIG. 19C)

Upon holding the click at the edge of the page, the flipping speed has to increase until it reaches a certain limit.

Referring to 6, 8, 900 FIGS. 1, 18, 19A-19C, there are different ways the user can flip pages. If the cursor moves over the corners of the book, the page corner is lift up a little bit indicating that it is ready to be flipped. And then if the user clicks on that corner, one page is flipped forward or backward depending on the corner the cursor is at.

If the hardware that is running the book operating system has a pad-like mouse, similar to the mouse pad available in on most laptops, if the cursor is close to one of the book corners, then the page can be flipped by simply emulating the classical page flipping by the finger tip being swiped over that pad to the flipping direction.

If the cursor is on one of the book page four corners and the user clicks on the page to be flipped as described above, but instead of releasing the clicking once the first page is flipped, then after a short time (approximately one second for example), three pages can be flipped in the same direction. Then if the clicking still on, then another group of pages is flipped and so forth. The number of pages being flipped in this fashion increases exponentially as the user keeps holding the clicking continuously down.

10.3 Clickable Section Titles

As the user moves the cursor over the edges of the pages at the book left and right frame sides, and according to the page over which edge the cursor is at, the title of the section appears to allow the user to click to open the corresponding section.

11—Supplemental Image Display 30 FIG. 1

Referring to 30 FIG. 1, continuous images can be varied to correspond to the topic displayed in a given page. Supplemental images (additional teaching) references for elaborating and further teaching/illustrating of topics, can be hidden or viewed as selected. The supplemental images can be added to the content anyplace in the digital book. Being auxiliary and non-core material, the user can select to show or hide this material at any point for additional teachings and illustrations of the topics.

12—Frame Shows Clickable Sections 10, 12, 1000 FIGS. 1, 20 and 21A-21C.

Figure 20:
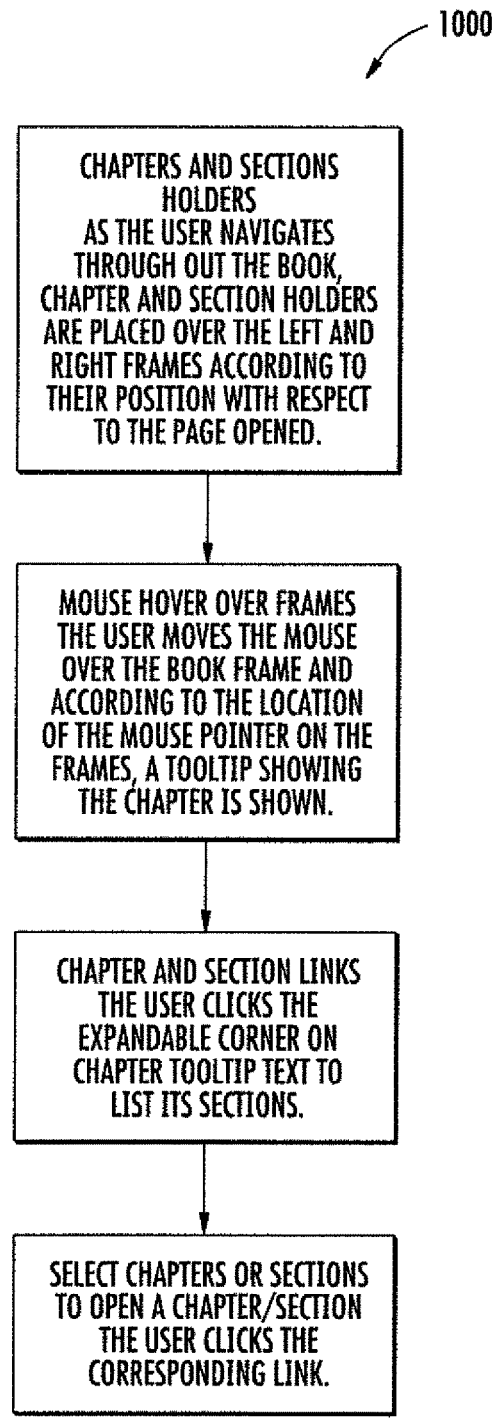
FIG. 20 is a flowchart for implementing clickable Chapters and Sections on Frames.
Figure 21A:
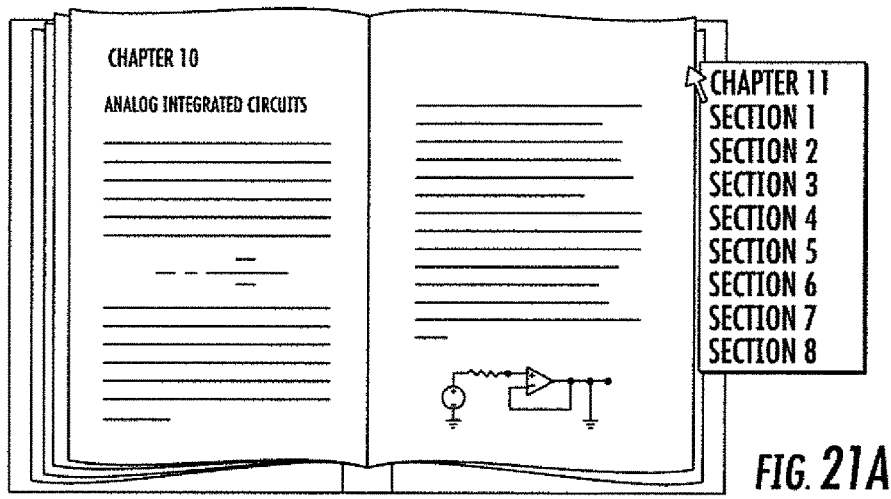
FIGS. 21A, 21B and 21C show clickable chapters and sections on frames.
Figure 21B:
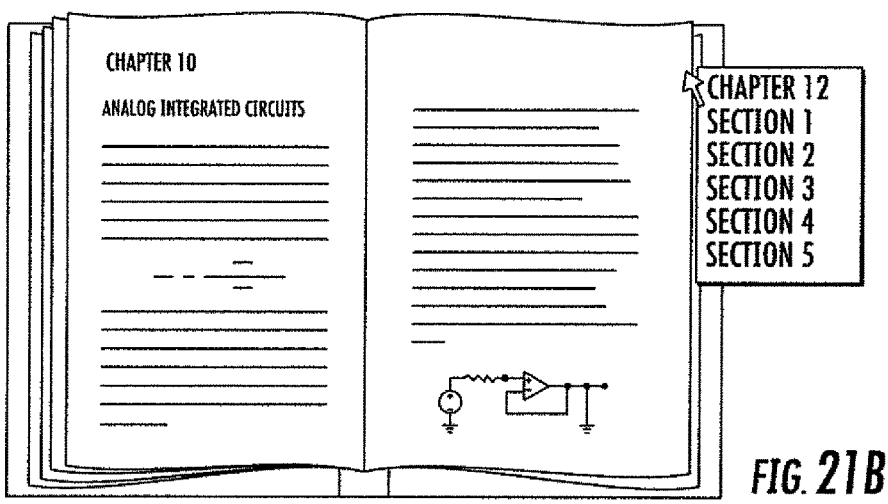
Figure 21C:
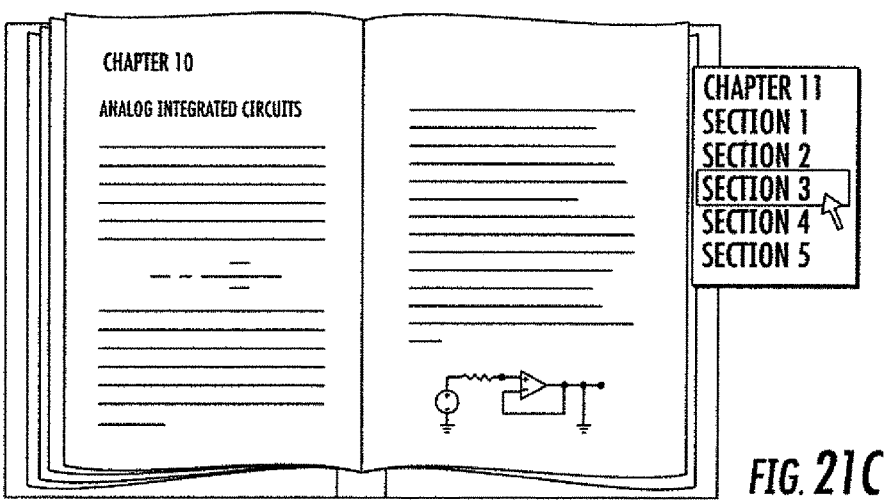

Right and left frame should be divided into equal spaces, each representing a chapter from the book, once the user hover the mouse over that region, the invention has to pop-down a list of sections of that chapter. The sections are clickable and allow fast access to book content. The granularity of the view has to vary between fine-grain (sections) and coarse-grain (chapters), we believe that we have to directly (on the frame) show the sections of the currently opened chapter. But for the other chapters, we will just pop-down a menu upon hovering the mouse over the frame, and in this menu we will show all sections. FIG. 20 shows a flowchart to carry our implementation. An image on the screen can show overlapping pages edges 10, 12, that when clicked on allow the user to go to different sections and chapters.

Referring to 10, 12, 1000 FIGS. 1, 20 and 21A-21C, as the user moves the cursor over the edges of the pages at the book left or right frame sides, and according to the page over which edge the cursor is at, the title of the section appears on which the user can click to open the corresponding section.

13—Hide Some Parts of the Open Pages 32, 1100 FIGS. 1, 22, 23A and 23B

Figure 22:
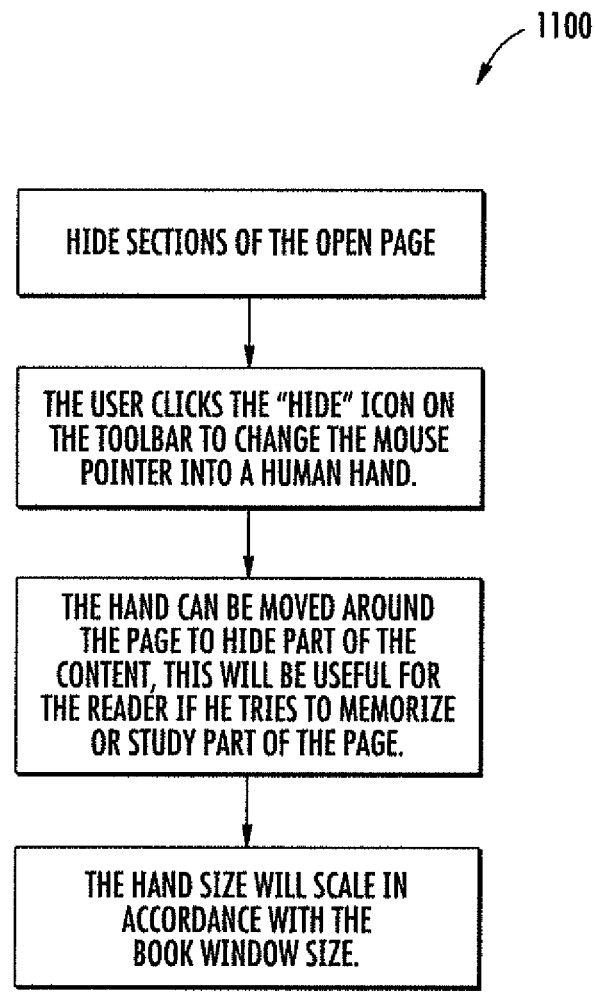
FIG. 22 is a flowchart for implementing Page Hiding.
Figure 23A:
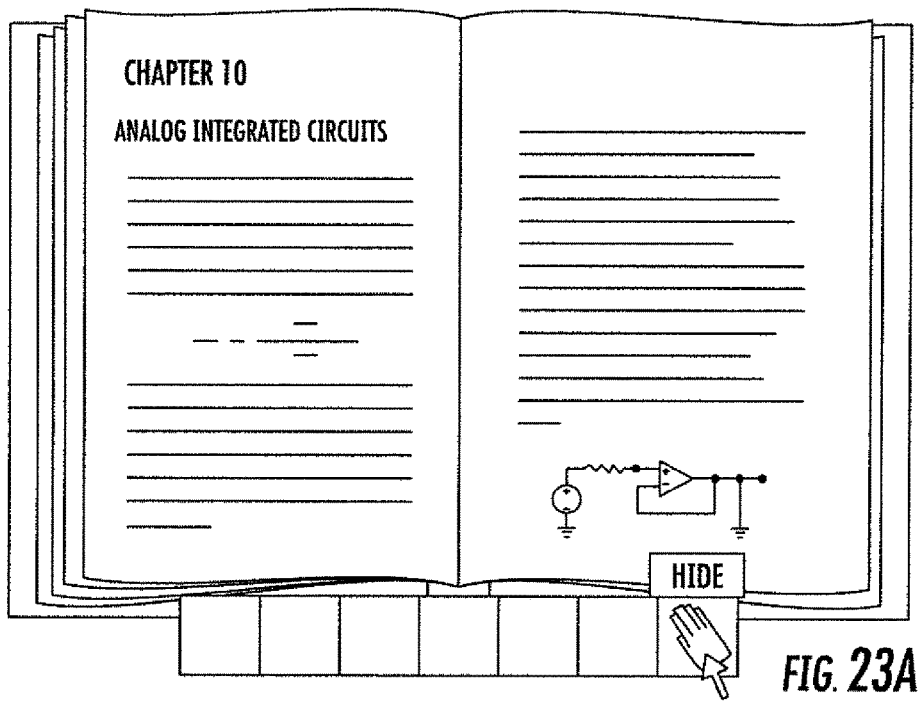
FIGS. 23A and 23B show use of the page hiding feature.
Figure 23B:
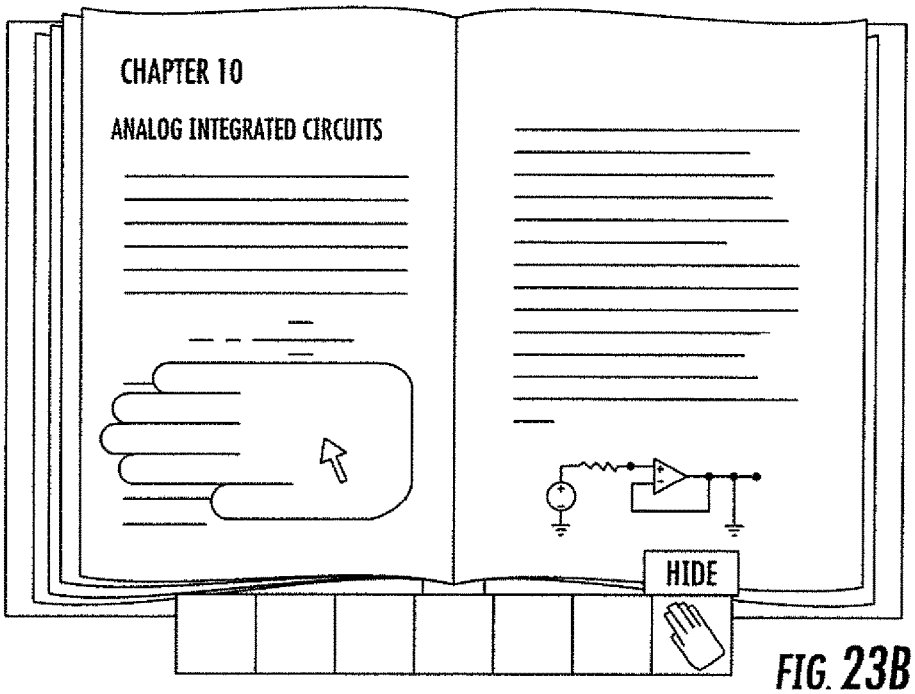

The user can use a "hand" icon to hide any part of the page in order to allow users to memorize, review, or recall the hidden content. FIG. 22 shows a flowchart for an example implementation.

Referring to 32, 1100 FIGS. 1, 22, 23A, 23B, this feature is analogous to using the actual hand of a reader to cover a part of the book to pick the mind and self-test, the user's information. The invention enables hiding parts of the pages to emulate the human hand effect.

14—Things you should remember 34 FIG. 1.

This feature has to be implemented as other content (text, image, etc.) as specified by the authors and publishers of the digital book being used.

Referring to 34 FIG. 1, as the user is about to leave a section or a topic, the invention displays a message that contains key points that the user needs to remember having finished reading through that topic. The icon can activate key points that the user can automate. The user can also selectively choose a listing of key learning points at the end of each section.

Figure 24:
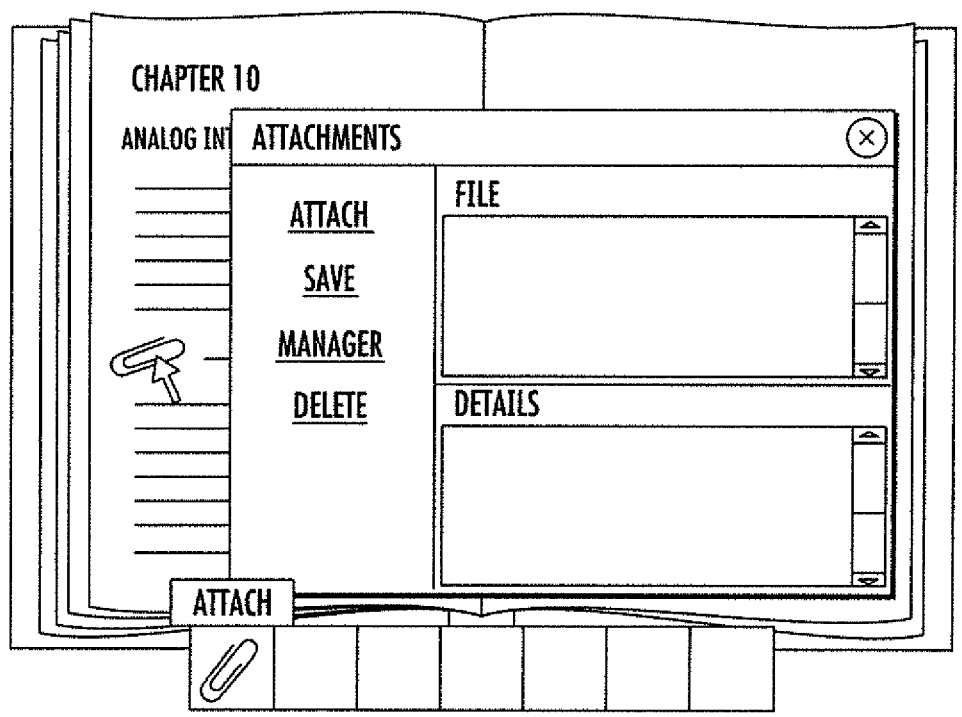
FIG. 24 shows description attachment feature.

15—Attach files to eBook content 36 FIGS. 1, 24.

The user may also to attach any file (video, image, presentation, etc.) to invention objects. Subsections 15.1 to 15.3 describe this feature.

15.1 Attach File (1)

The user can be able to attach a file to any object in the book. An indication beside the object should reflect that there is an attachment associated with it.

15.2 Delete Attachment (1)

The user can be able to delete an attachment.

15.3 Manage Attachments (1)

This is a screen that shows a list of all attachments in the entire digital book. The user can delete/update/run attachments from there, and can also double click a certain attachment to render the book opened on the page that contains the note.

Referring to 36 FIGS. 1, 24, it is possible for the user to attach any file to the digital book and pinpoint it on any location throughout the pages of the book. An example of this feature is to attach a presentation, PDF type document, datasheet, video, or audio that pertains to the topic in that page or section.

Figure 26:
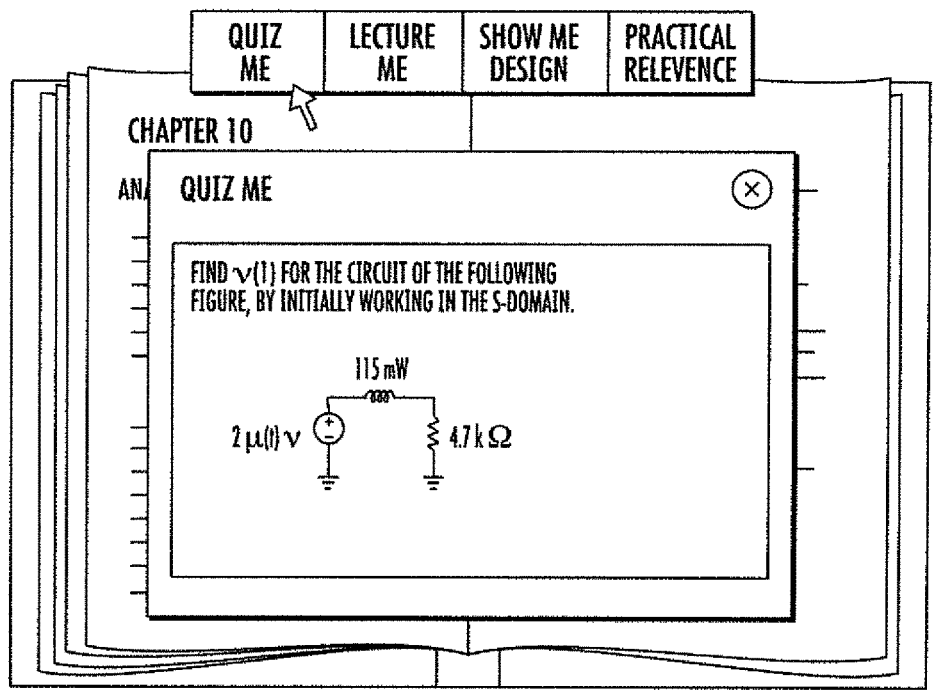
FIG. 26 shows separate window activated for QuizMe.
Figure 27A:
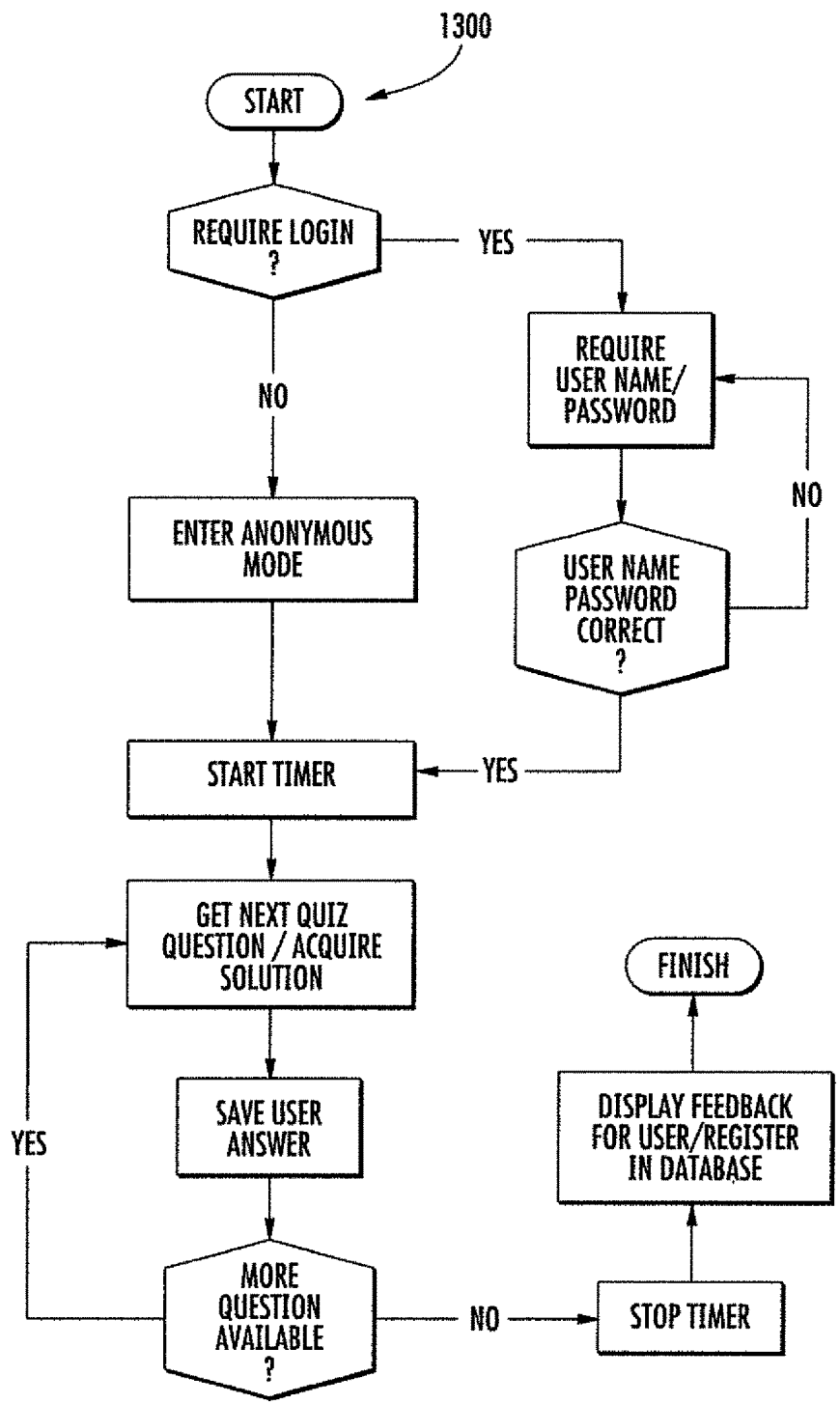
FIG. 27A is a flowchart for a Tutor Me feature.

16—Quiz Me 38, 1200 FIGS. 1, 26, 27A

The Quiz me module is a stand-alone application that can be used with or separately from the rest of the invention.

Figure 25A:
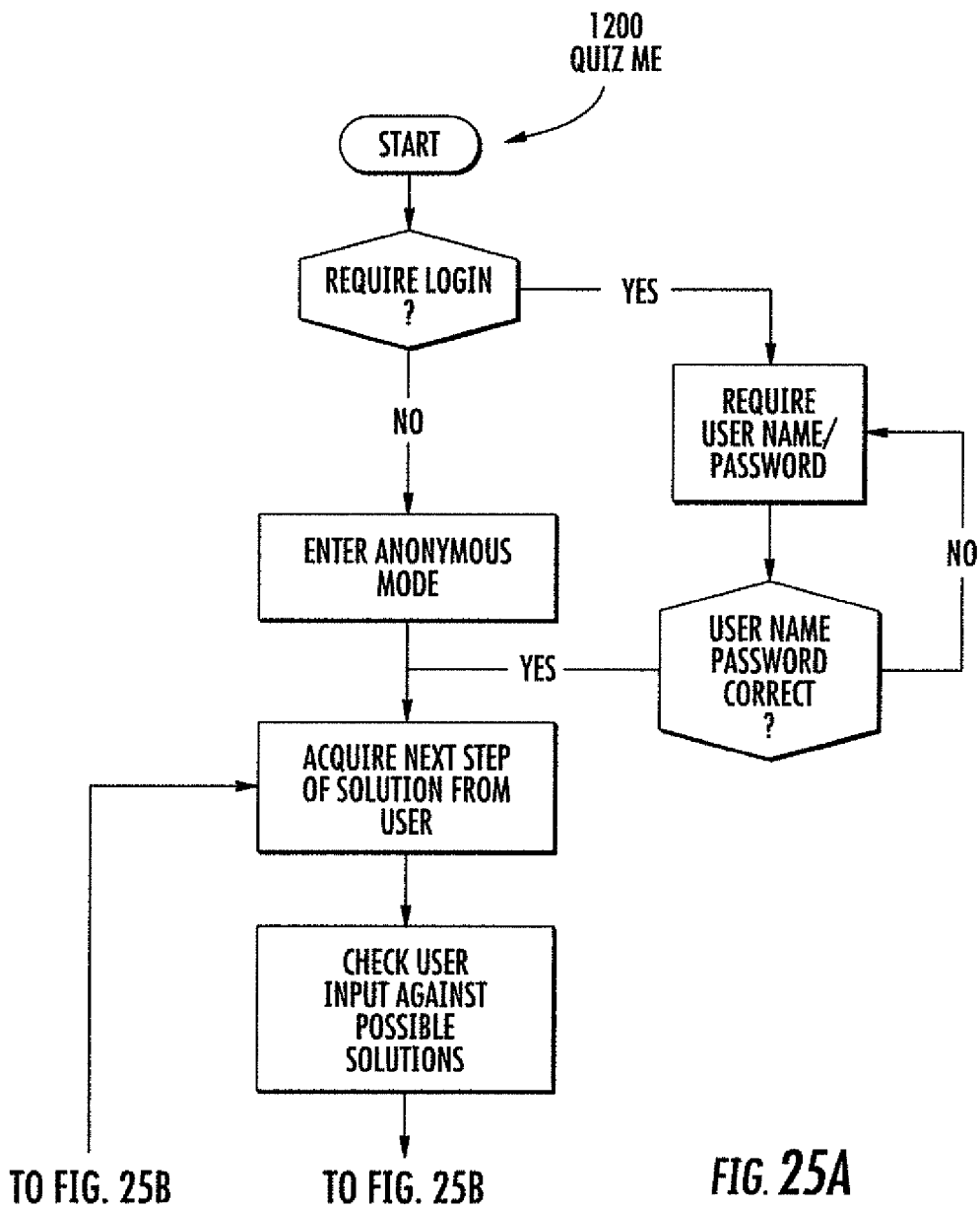
FIG. 25A is a flowchart for invoking the Tutor Me module.
Figure 25B:
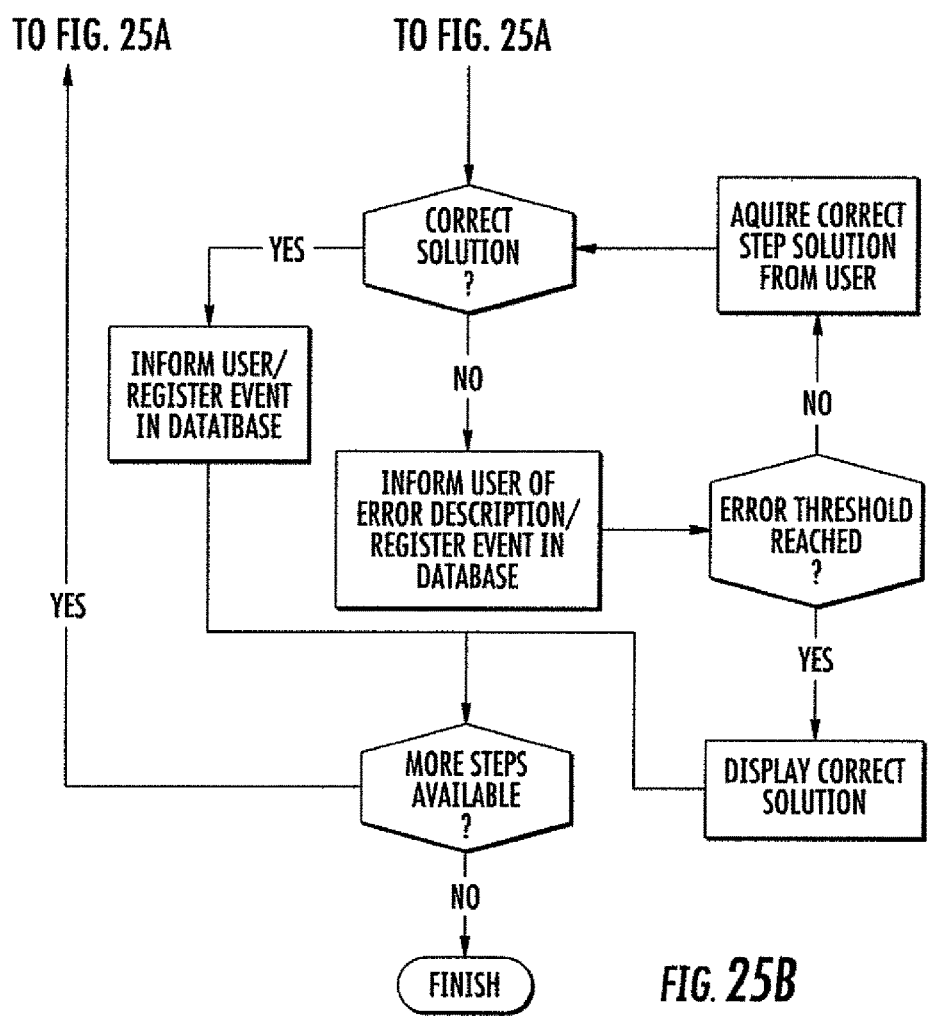
FIG. 25B is a flow diagram continuation from FIG. 25A showing additional steps in the QuizMe module.

Referring to 38, 1200 FIGS. 1, 25-26, on the toolbar there can be link to start a quiz. The quiz can consist of a certain number of multiple choice type problems for the user to solve within a certain selected time period. A timer can be displayed to show the quiz time elapsed. Questions can be displayed to the user in tandem one at a time. A feedback can be provided to the user at the end of the quiz session.

17—Lecture Me 40 FIGS. 1, 26

The Lecture me module can be a stand-alone application that will be used with or separately from the rest of the invention. The lecture materials can consist of video, audio, animation, and the like.

Referring to 40 FIGS. 1, 26, on the toolbar there can be link to start a lecture. The lecture can be pre-saved video and audio content of a lecture about the topic being selected.

18—Tutor Me 40, 1300 FIGS. 1, 25-27C.

Referring to 40, 1300 FIGS. 1, 25-27C, the user can be alternatively given a password or is allowed to enter an anonymous mode that allows for the user to receive a separate tutor session. The tutor session can combine the lecture and quiz me features 16-17 described above. The user can be tested for their input to a problem and compares the answer against possible solutions, where the user needs to answer the problem or reach an error threshold value (limited number of answer responses) before the correct solution is displayed. Additional problems can pass through similar steps until the user is finished being tutored in a topic or section or chapter as needed.

The system is designed to take the student's inputted equations, analyze them, expand them, and chop them into terms that would be easy to compare against the correct terms. The code is designed to make a term by term comparison and display the adequate error message. In the comparison, several errors are accounted for such as: "wrong sign", "wrong term", "too many terms", "missing a term". By giving these specific error messages, the students would be able to detect the exact areas they are having problems in. For example, if a "wrong sign message" is given, the user might want to check on the assumed current directions or voltage polarities. Furthermore, after imputing the wrong term for five times or more, the user will be given the option of viewing the correct answer.

Figure 32:
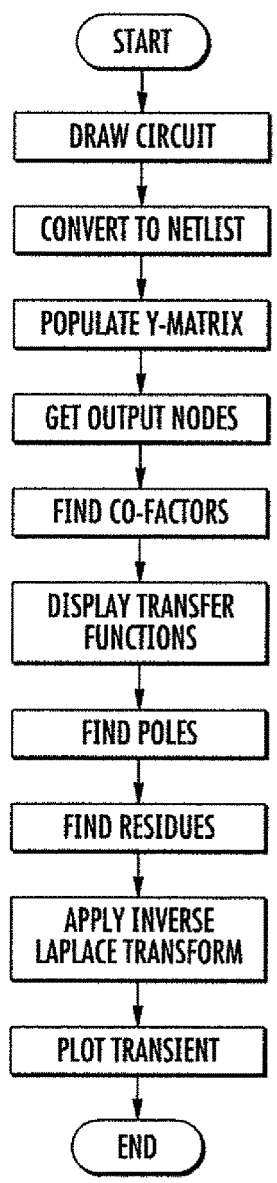
FIG. 32 is a flow diagram showing an example of step for implementing a symbolic circuit solver.

18.1 Graphical User Interface FIG. 32

A Graphical User Interface was developed as the input of the Symbolic Tool using the Java® SWING library. It consists of a drawing window with a grid where the user can draw an arbitrary circuit by placing predefined component on the drawing area and connecting between them, thus creating the circuit. As mentioned in the introduction the GUI is web ready and can be run remotely from within a browser. It has various useful capabilities such as drag/drop of components, rotate components, make wire connections and so forth. Also appropriate values can be chosen for each element and if any errors exist the user is notified. On the right side of the drawing area there are bottoms that either Zoom in or out the circuit schematic, or obtain the Netlist. Likewise the drop down menu above the drawing area houses standard editing tools and Simulation & Analysis menu which invokes the Symbolic Circuit Solver.

The Netlist parser component analyses the constructed circuit which in this case is represented in memory by a well-structured object hierarchy and translates it into a Netlist in CirML format, which is the format used by SPICE. The Parser also has the capability of transforming the CirML Netlist back into a well-structured object hierarchy, meaning that the used can enter the Netlist first then obtain the circuit schematic from that Netlist. Simplification procedures are implemented so as to optimize the for of the Netlist and remove any redundancy from the result.

The Symbolic Circuit Solver component is the core of the Interactive Linear Circuits Symbolic Simulation Tool. It is subdivided into several subroutines which when applied in succession to a Netlist yield the Symbolic time response. The flowchart of FIG. 32 starting from third execution bloc shows an outline of what each subroutine does. After simulation is requested by the user through the Simulation & analysis menu the Netlist Parser passes the Netlist into a class that uses the list data to populate the Indefinite Admittance Matrix for the circuit. Then an algorithm is used for obtaining the transfer function between any two ports through computing the determinant and different cofactors of the aforementioned matrix. The Indefinite Admittance Matrix is populated like any regular admittance matrix. The only difference is that the ground reference node is considered to be outside the circuit. Note that all entries are in the frequency domain since a dynamic response is desired.

Then depending on which outputs the user chooses to compute the symbolic results for, the program computes all required determinants an cofactors symbolically. The algorithms are adjusted to manipulate symbolic objects rather than just numerical values. Determinants were implemented using the method of LU factorization since it is fast and efficient which is a big advantage for a simulation tool, and it was actually discovered that this part is not a bottleneck for the simulation, unlike later parts where large symbolic results may need to be manipulated. All transfer functions are modeled as objects and are reduced to a standard rational s-function (Laplace domain) form before being displayed. The next step extracts the roots of the s-function denominator, it is well known that the values and number of the roots depend on the coefficients and order of the circuit (number of storage elements) respectively. Those same coefficients are of course functions of the circuit parameters (admittances, Capacitance and inductance values, etc.). at this point the numerical values of the circuit components are substituted into the transfer functions since it is impossible to get roots in closed symbolic form for polynomial equation larger than fifth order (Abel-Ruffini Theorem).

The Java® class that implemented the above algorithm returns all roots with the multiplicity for each one. It then hands the root date to another module that applies Residue theorem to essentially obtain the partial fraction expansion of the transfer function.

All partial fraction objects are then fed into the Symbolic Inverse Laplace transform module which constructs the final required time response. The GUI provides tools for graphically plotting such responses with respect to time or just plotting the frequency response.

Figure 27B:
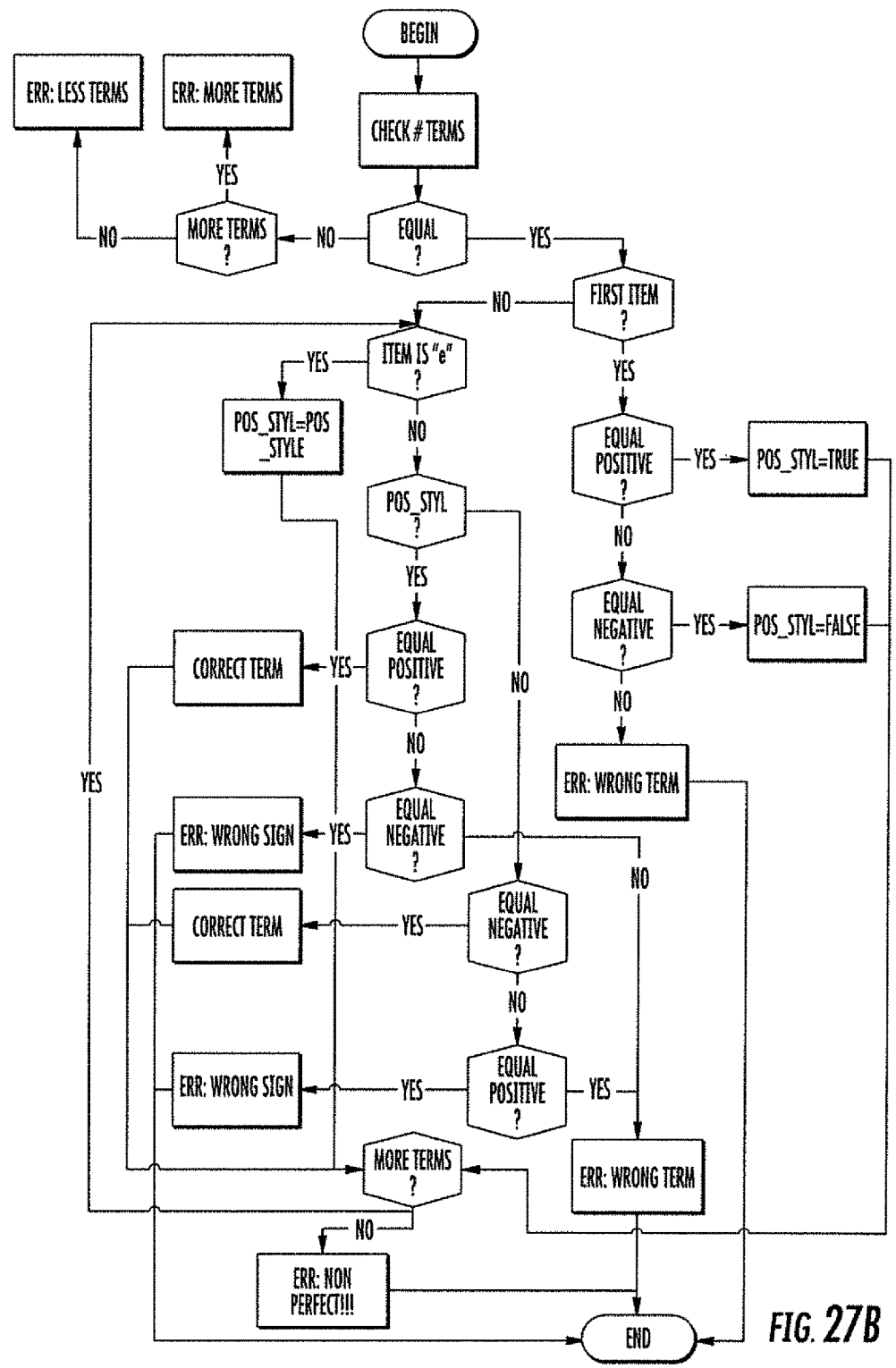
FIG. 27B is a flowchart for comparing the terms for the inserted equation in Tutor Me.
Figure 27C:
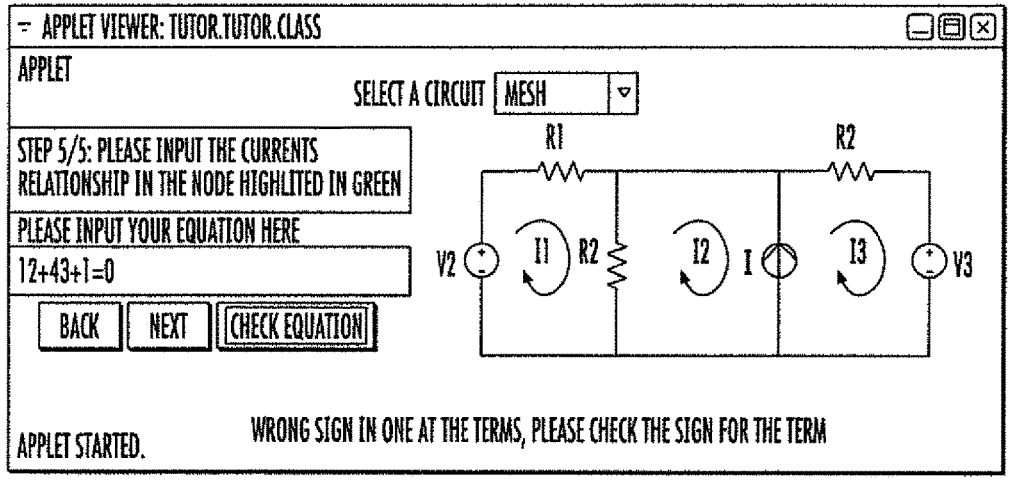
FIG. 27C is a screenshot for an error message for incorrect sign in Tutor Me.

In order to create the adequate code that would compare the student's equations against the correct equations for a given circuit, the flowchart displayed in FIG. 27B has been created. As the flow chart explains, the program starts by checking the number of terms of the inserted equation and gives the corresponding error message if that number does not equal the correct equation's number of terms. The following step is checking for legitimacy of the terms' signs and then the validity of those terms. Using the flow chart created for the program, a code has been created to compare each term of the inputted equation.

19—Show me Design 44 FIG. 1

The Show me Design module can be a stand-alone application that can be used with or separately from the rest of the invention. The design materials will correspond to the topic being discussed.

Referring to 44 FIG. 1, if the book is a technical book where design problems are valid, the toolbar can contain a link to start a design case (i.e. images, text, equations, circuits of the design) to ossify the main concepts of the topic.

20—Show Me Practical Relevance 46 FIG. 1

The Show me Practical Relevance module can be a stand-alone application that can be used with or separately from the rest of the invention. The practical application presented will correspond to the topic being discussed.

Referring to 46 FIG. 1, if the book addresses a topic that has a practical relevance, the toolbar can contain a link that starts a practical relevance case along with images, datasheets, and documents from the real-world.

Figure 28:
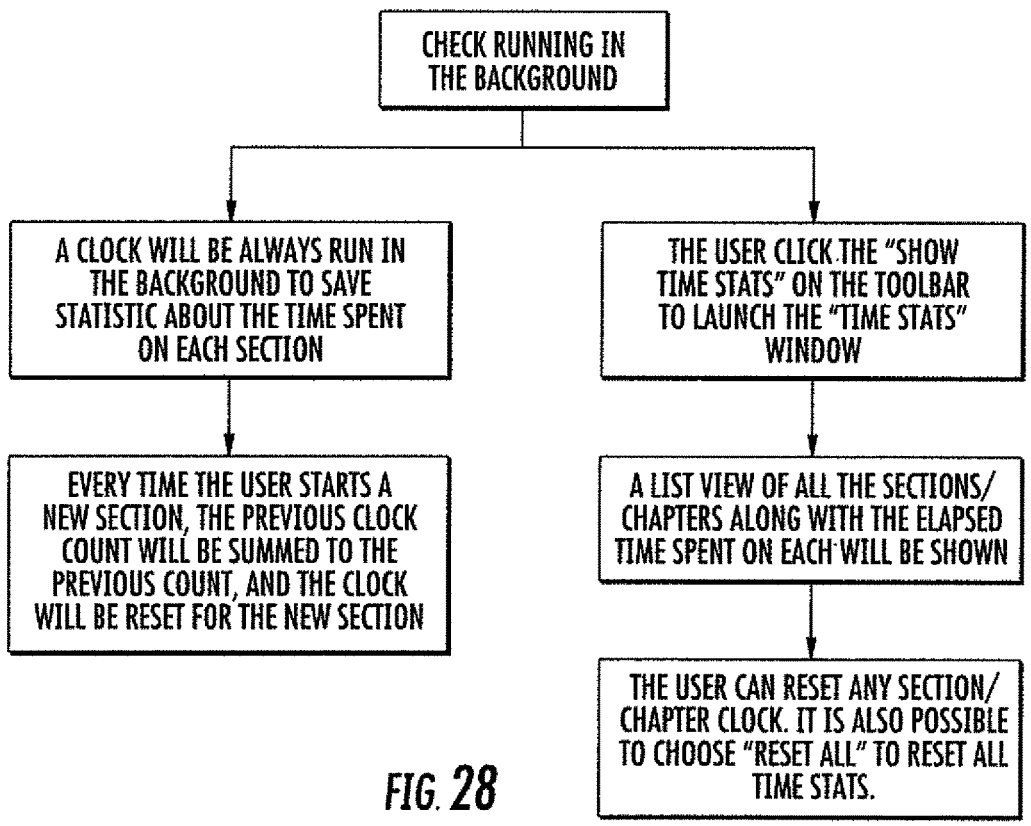
FIG. 28 is a flowchart for implementing a background clock.
Figure 29:
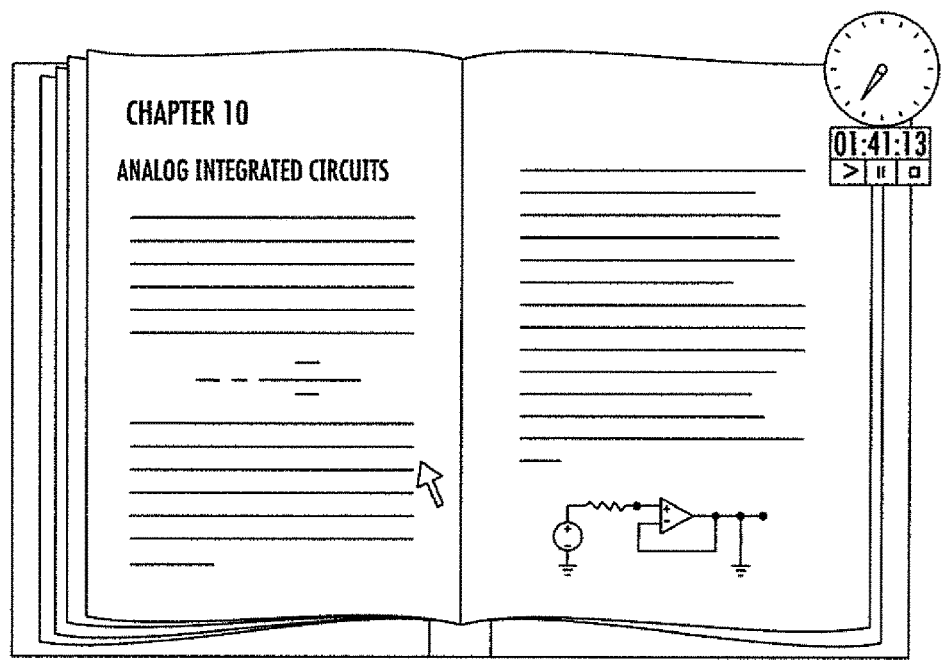
FIG. 29 shows clock display activated.

21—Clock Running in the Background 1400 FIGS. 28-29

This clock (FIG. 29) is very expandable, and can save the times across multiple runs and show it beside times for the current run, and we can show times per chapter/section/example/etc. FIG. 28 shows a flowchart to carry our implementation.

Referring to FIGS. 28-29, a clock can run in the background to estimate the time spent on each section as a sort of student assessment. According to this assessment, the level of the quiz problems can be effected.

Figure 30:
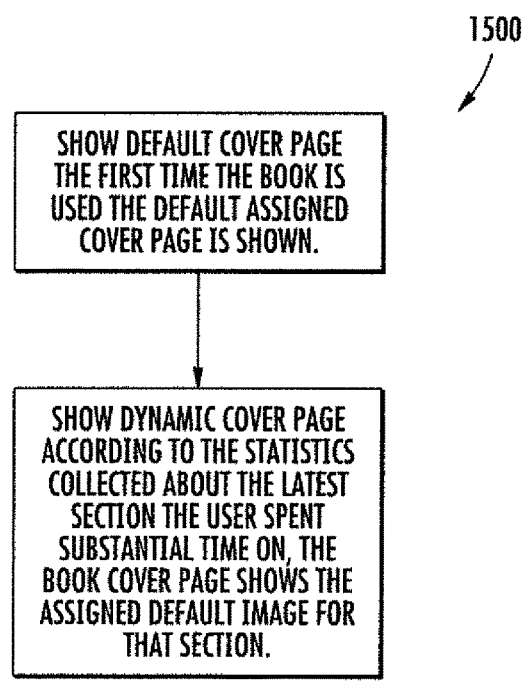
FIG. 30 is a flowchart for implementing a Dynamic Cover Page.

22—Dynamic Cover Page 1500 FIG. 30

Dynamic cover pages for the invention and its sections can be predefined with meaningful messages to deliver for the user. The invention can pick the predefined cover and display it based on the collected statistics. FIG. 30 shows a flowchart 1500 to carry our implementation.

Referring to 1500 FIG. 30, the invention keeps track of the latest browsed through topics with the weaknesses and strengths of the user it collects by the quizzes and the time spent per topic. Accordingly, the cover page shows images, messages, and measures that change every time the user opens their digital book.

Figure 31:
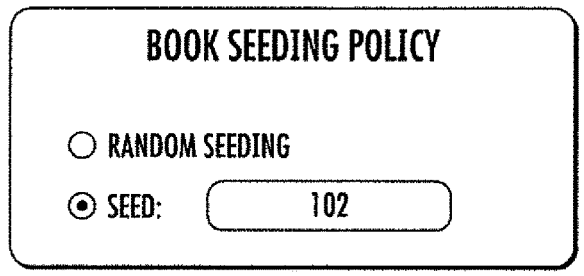
FIG. 31 is a seed generator icon activated for selected seed value or random value.

23—Seeded Content 48, 1600 FIGS. 1, 31.

Since the invention is highly interactive with continually present randomized values for the examples, drill problems, practical and design examples, quizzes and end-of-chapter problems, uniformity of values may be established when needed. Hence, we can assign seeds that correspond to fixed values through out the invention. This feature is very helpful to instructors who desire that all students to study the same content (assigned numerical values) and tackle the same problems.

Referring to 48, 1600 FIGS. 1 and 31, the teacher/instructor can assign different numbers (seeds) to the end of a chapter/section problems so that the class can have consistent answers.

Alternatively, each of the students can be assigned separate seeds to prevent copying of answers and prevent cheating during assignments.

In addition to assigning uniform seeds, the invention can allow for random generated seeds be given to the students so that no two students can generate the same answers to problems, and the like.

24—Other Features 50, 52, 54 FIG. 1.

The idea is to construct the page with multiple layers containing analysis of a topic with different difficulty levels, and methods of solving the same problem in a given level. The purpose is to give flexibility to the user and benefit a large diversity of students as far as the level of their understanding of the material and to see how a given problem is being solved. At any point of the analysis, the user can switch to a different difficulty level problem by a click of a button.

Each layer or level contains children layers representing different methods for the solution. For instance, the user can switch between figures A and B to view the effect of changing the current or voltage directions. Furthermore, the student can choose to view either the symbolic or numerical solution for each example as shown below:

The electronic textbook is a well organized tool with the following features:

1. Difficulty Levels: Discussion within the text which covers four levels of difficulty as shown in FIG. 1 exhibit 52.

2. Solution Methods: Examples which cover up to four levels of difficulty with each level will include up to four different techniques of solutions labeled as: A, B, C, D as shown in FIG. 1 exhibit 50.

3. Each technique is solved symbolically and numerically as shown in 54 FIG. 1.

4. Rolling Images: Each level includes sets of images with the same elements but different placements and arrangements. Arrow buttons permit the switching between those arrangements.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

That which is claimed is:

1. A computing device comprising:
a display;
a memory to store electronic textbook data comprising at least one configurable problem to be solved using a given solution technique from among a plurality of different solution techniques, the at least one configurable problem having a plurality of different difficulty levels associated therewith;
a user input pointing device; and
a processor coupled to said display, said memory, and said user input pointing device and configured to
display the electronic textbook data with the at least one configurable problem on said display,
determine a given difficulty level for solving the at least one configurable problem from among the plurality of different difficulty levels,
selectively change the given solution technique for the at least one configurable problem based upon actuation of the user input pointing device, and
display a solution for the at least one configurable problem on said display based upon the change in the given solution technique and the given difficulty level.

2. The computing device of claim 1 wherein at least one of the plurality of different solution techniques comprises a symbolic solution technique for the at least one configurable problem.

3. The computing device of claim 1 wherein at least one of the plurality of different solution techniques comprises a numerical solution technique for the at least one configurable problem.

4. The computing device of claim 1 wherein the at least one configurable problem comprises at least one electronic circuit problem.

5. The computing device of claim 4 wherein at least one of the plurality of different solution techniques comprises a mesh analysis.

6. The computing device of claim 1 wherein the at least one configurable problem comprises at least one scientific problem.

7. The computing device of claim 1 wherein the at least one configurable problem comprises at least one mathematical problem.

8. A method for using a computing device comprising a display, a memory, and a user input pointing device, the method comprising:
storing electronic textbook data comprising at least one configurable problem to be solved using a given solution technique from among a plurality of different solution techniques, the at least one configurable problem having a plurality of different difficulty levels associated therewith;
displaying the electronic textbook data with the at least one configurable problem on the display,
determining a given difficulty level for solving the at least one configurable problem from among the plurality of different difficulty levels,
selectively changing the given solution technique for the at least one configurable problem based upon actuation of the user input pointing device, and
displaying a solution for the at least one configurable problem on the display based upon the change in the given solution technique and the given difficulty level.

9. The method of claim 8 wherein at least one of the plurality of different solution techniques comprises a symbolic solution technique for the at least one configurable problem.

10. The method of claim 8 wherein at least one of the plurality of different solution techniques comprises a numerical solution technique for the at least one configurable problem.

11. The method of claim 8 wherein the at least one configurable problem comprises at least one electronic circuit problem.

12. The method of claim 11 wherein at least one of the plurality of different solution techniques comprises a mesh analysis.

13. A non-transitory computer-readable medium for a computing device comprising a display, a memory, and a user input pointing device, the non-transitory computer-readable medium having computer-executable instructions for causing the computing device to perform steps comprising:
storing electronic textbook data comprising at least one configurable problem to be solved using a given solution technique from among a plurality of different solution techniques, the at least one configurable problem having a plurality of different difficulty levels associated therewith;
displaying the electronic textbook data with the at least one configurable problem on the display,
determining a given difficulty level for solving the at least one configurable problem from among the plurality of different difficulty levels,
selectively changing the given solution technique for the at least one configurable problem based upon actuation of the user input pointing device, and
displaying a solution for the at least one configurable problem on the display based upon the change in the given solution technique and the given difficulty level.

14. The non-transitory computer-readable medium of claim 13 wherein at least one of the plurality of different solution techniques comprises a symbolic solution technique for the at least one configurable problem.

15. The non-transitory computer-readable medium of claim 13 wherein at least one of the plurality of different solution techniques comprises a numerical solution technique for the at least one configurable problem.

16. The non-transitory computer-readable medium of claim 13 wherein the at least one configurable problem comprises at least one electronic circuit problem.

17. The non-transitory computer-readable medium of claim 16 wherein at least one of the plurality of different solution techniques comprises a mesh analysis.

* * * * *